(12) United States Patent
Yamagami et al.

(10) Patent No.: US 10,579,429 B2
(45) Date of Patent: Mar. 3, 2020

(54) LOG SYSTEM AND LOG METHOD

(71) Applicant: FUJITSU LIMITED, Kawasaki-shi, Kanagawa (JP)

(72) Inventors: Takuma Yamagami, Itabashi (JP); Isao Higashi, Yokohama (JP); Koji Nakazono, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 120 days.

(21) Appl. No.: 15/832,901

(22) Filed: Dec. 6, 2017

(65) Prior Publication Data

US 2018/0173569 A1 Jun. 21, 2018

(30) Foreign Application Priority Data

Dec. 16, 2016 (JP) ................. 2016-244507

(51) Int. Cl.
  *G06F 9/50* (2006.01)
  *G06F 9/48* (2006.01)
  *G06F 11/14* (2006.01)
  *G06F 9/54* (2006.01)

(52) U.S. Cl.
  CPC .......... *G06F 9/5038* (2013.01); *G06F 9/4881* (2013.01); *G06F 9/505* (2013.01); *G06F 9/54* (2013.01); *G06F 11/1471* (2013.01)

(58) Field of Classification Search
  CPC ...... G06F 9/5038; G06F 9/4881; G06F 9/505; G06F 9/54; G06F 11/1471
  See application file for complete search history.

(56) References Cited

U.S. PATENT DOCUMENTS

| | | | |
|---|---|---|---|
| 9,529,630 B1 * | 12/2016 | Fakhouri | ............. G06F 9/54 |
| 2006/0106894 A1 * | 5/2006 | Richardson | ......... G06F 16/273 |
| 2014/0143401 A1 | 5/2014 | Carlen et al. | |
| 2015/0365497 A1 | 12/2015 | Zhao et al. | |

FOREIGN PATENT DOCUMENTS

| | | |
|---|---|---|
| JP | 2014-524096 | 9/2014 |
| JP | 2016-511878 | 4/2016 |

* cited by examiner

*Primary Examiner* — Jacob D Dascomb
(74) *Attorney, Agent, or Firm* — Xsensus LLP

(57) ABSTRACT

A log system includes, a storage device, first circuitry configured to control the application execution environments, and second circuitry configured to transmit each of the requests to a selected one of the application execution environments, wherein a first application execution environment is configured to, execute a first process for processing the first request, add second request information to the second request, transmit the added second request to the second circuitry, execute first output of process information identifying a first process, reception information identifying the first application execution environment, the second request information, source information identifying the first application execution environment, and a first log, wherein the second circuitry is configured to, transmit the second request to a second application execution environment, and execute second output of the source information identifying the first application execution environment, destination information identifying the second application execution environment, and the second request information.

13 Claims, 15 Drawing Sheets

FIG. 8

| LOAD BALANCER DATABASE 31 (LB-DB) | IP (from) | REQ-ID | LB-IP | CONT-IP (to) | FUNC | LB-TIME |
|---|---|---|---|---|---|---|
| | ... | ... | ... | ... | ... | ... |

| RECEIVER DATABASE 32 (RSV-DB) | LB-IP (from) | CONT-IP | REQ-ID | ND-ID | CONT-ID | PID (to) | RSV-TIME |
|---|---|---|---|---|---|---|---|
| | ... | ... | ... | ... | ... | ... | ... |

| TRANSMITTER DATABASE 33 (TRS-DB) | PID (from) | ND-ID | CONT-ID | CONT-IP | REQ-ID | TRS-TIME |
|---|---|---|---|---|---|---|
| | ... | ... | ... | ... | ... | ... |

| LOG DATABASE 34 (LOG-DB) | ND-ID | CONT-ID | PID | LOG | LOG-TIME |
|---|---|---|---|---|---|
| | ... | ... | ... | ... | ... |

FIG. 11

| | | IP (from) | REQ-ID | LB-IP | CONT-IP (to) | FUNC | LB-TIME | |
|---|---|---|---|---|---|---|---|---|
| LOAD BALANCER DATABASE 31 (LB-DB) | (a1) | 10.x.x.x | | y.y.y.1 | x.x.1.1 | UI | 09:08:40 | USER INTERFACE |
| | (b1) | x.x.2.1 | b | y.y.y.1 | x.x.1.1 | GDISP | 09:09:10 | |
| | | x.x.1.1 | a | y.y.y.2 | x.x.2.1 | ACCNT | 09:09:35 | ACCOUNT MANAGEMENT |
| | (c1) | x.x.1.1 | b | y.y.y.5 | x.x.5.1 | DATAM | 09:10:25 | DATA MANAGEMENT |

| | | LB-IP (from) | CONT-IP | REQ-ID | ND-ID | CONT-ID | PID (to) | RSV-TIME | |
|---|---|---|---|---|---|---|---|---|---|
| RECEIVER DATABASE 32 (RSV-DB) | (a2) | y.y.y.1 | x.x.1.1 | | 1 | 11 | 1 | 09:09:00 | USER INTERFACE |
| | | y.y.y.1 | x.x.1.1 | b | 1 | 11 | 1 | 09:09:30 | |
| | (b2) | y.y.y.2 | x.x.2.1 | a | 2 | 21 | 1 | 09:09:50 | ACCOUNT MANAGEMENT |
| | | y.y.y.1 | x.x.1.2 | c | 1 | 12 | 1 | 09:10:10 | |
| | (c2) | y.y.y.5 | x.x.5.1 | b | 5 | 52 | 1 | 09:10:30 | |
| | | y.y.y.2 | x.x.2.1 | d | 2 | 21 | 1 | 09:11:20 | DATA MANAGEMENT |

| | | PID (from) | ND-ID | CONT-ID | CONT-IP | REQ-ID | TRS-TIME | |
|---|---|---|---|---|---|---|---|---|
| TRANSMITTER DATABASE 33 (TRS-DB) | (a5) | 1 | 2 | 21 | x.x.2.1 | | 09:09:00 | |
| | | 1 | 1 | 11 | x.x.1.1 | b | 09:09:30 | USER INTERFACE |
| | (b4) | 1 | 2 | 21 | x.x.2.1 | a | 09:10:20 | ACCOUNT MANAGEMENT |
| | | 1 | 2 | 21 | x.x.2.2 | a | 09:11:00 | |

| | | ND-ID | CONT-ID | PID | LOG | LOG-TIME | |
|---|---|---|---|---|---|---|---|
| LOG DATABASE 34 (LOG-DB) | | 1 | 11 | 1 | xxxxx | 09:08:50 | |
| | (a3) | 1 | 11 | 1 | xxxxx | 09:09:10 | USER INTERFACE |
| | (a4) | 1 | 11 | 1 | xxxxx | 09:09:15 | USER INTERFACE |
| | | 2 | 22 | 1 | xxxxx | 09:09:30 | |
| | (b3) | 2 | 21 | 1 | xxxxx | 09:10:00 | ACCOUNT MANAGEMENT |
| | | 1 | 12 | 1 | xxxxx | 09:10:20 | |
| | | 2 | 21 | 1 | xxxxx | 09:10:35 | ACCOUNT MANAGEMENT |
| | (c3) | 5 | 52 | 1 | xxxxx | 09:10:40 | DATA MANAGEMENT |
| | (d1) | 2 | 21 | 1 | ERR | 09:11:00 | ACCOUNT MANAGEMENT |
| | | 2 | 21 | 1 | xxxxx | 09:11:15 | ACCOUNT MANAGEMENT |
| | (d2) | 2 | 21 | 1 | xxxxx | 09:11:30 | ACCOUNT MANAGEMENT |

| | ND-ID | CONT-ID | HIST-TIME |
|---|---|---|---|
| CONTAINER GENERATION HISTORY RECORD DATABASE 35 (HIST-DB) | 2 | 21 | 09:00:00 |
| | 2 | 22 | 09:00:00 |
| | 1 | 11 | 09:00:00 |
| | 1 | 12 | 09:00:00 |
| | 5 | 52 | 09:02:00 | ns
LOG SYSTEM AND LOG METHOD

CROSS-REFERENCE TO RELATED APPLICATION

This application is based upon and claims the benefit of priority of the prior Japanese Patent Application No. 2016-244507, filed on Dec. 16, 2016, the entire contents of which are incorporated herein by reference.

FIELD

The embodiments discussed herein are related to a log system and a log method.

BACKGROUND

A virtualization technique that is called a container and is to execute multiple processes (application programs) separated from each other in a single operating system (OS) environment has been proposed (refer to, for example, Japanese National Publication of International Patent Application No. 2016-511878). In a virtual technique of this type, a private cloud is provided by assigning a database, a logging service, a queue, a load balancer, and the like to each of containers (refer to, for example, Japanese National Publication of International Patent Application No. 2014-524096).

SUMMARY

According to an aspect of the invention, a log system includes, a storage device, first circuitry configured to control the application execution environments, and second circuitry configured to transmit each of the requests to a selected one of the application execution environments, wherein a first application execution environment is configured to, execute a first process for processing the first request, add second request information to the second request, transmit the added second request to the second circuitry, execute first output of process information identifying a first process, reception information identifying the first application execution environment, the second request information, source information identifying the first application execution environment, and a first log, wherein the second circuitry is configured to, transmit the second request to a second application execution environment, and execute second output of the source information identifying the first application execution environment, destination information identifying the second application execution environment, and the second request information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of information stored in a load balancer database, a receiver database, a transmitter database, and a log database that are illustrated in FIG. 7;

FIG. 11 is a diagram illustrating an example of information stored in the storage server by container servers in an authentication process corresponding to a login request illustrated in FIG. 10;

DESCRIPTION OF EMBODIMENTS

In conventional techniques, if multiple containers collaborate with each other to sequentially process requests, logs of events that have occurred due to the execution of processes are output from the containers and stored in a database or the like. For example, if an error occurs during the time when any of the containers processes a request, logs related to the occurrence of the error may be extracted by tracing, from a log indicating the error in the order opposite to the order in which the requests have been processed, logs output from the containers that have processed the requests. However, if multiple requests are redundantly processed by multiple containers, logs corresponding to the multiple requests are held in the database or the like, and it is difficult to automatically extract logs. Thus, a system administrator or the like who understands the flow of the requests extracts, one by one from the logs held in the database or the like, logs related to the request from which the error has occurred.

Hereinafter, embodiments are described with reference to the accompanying drawings.

Figure 1:
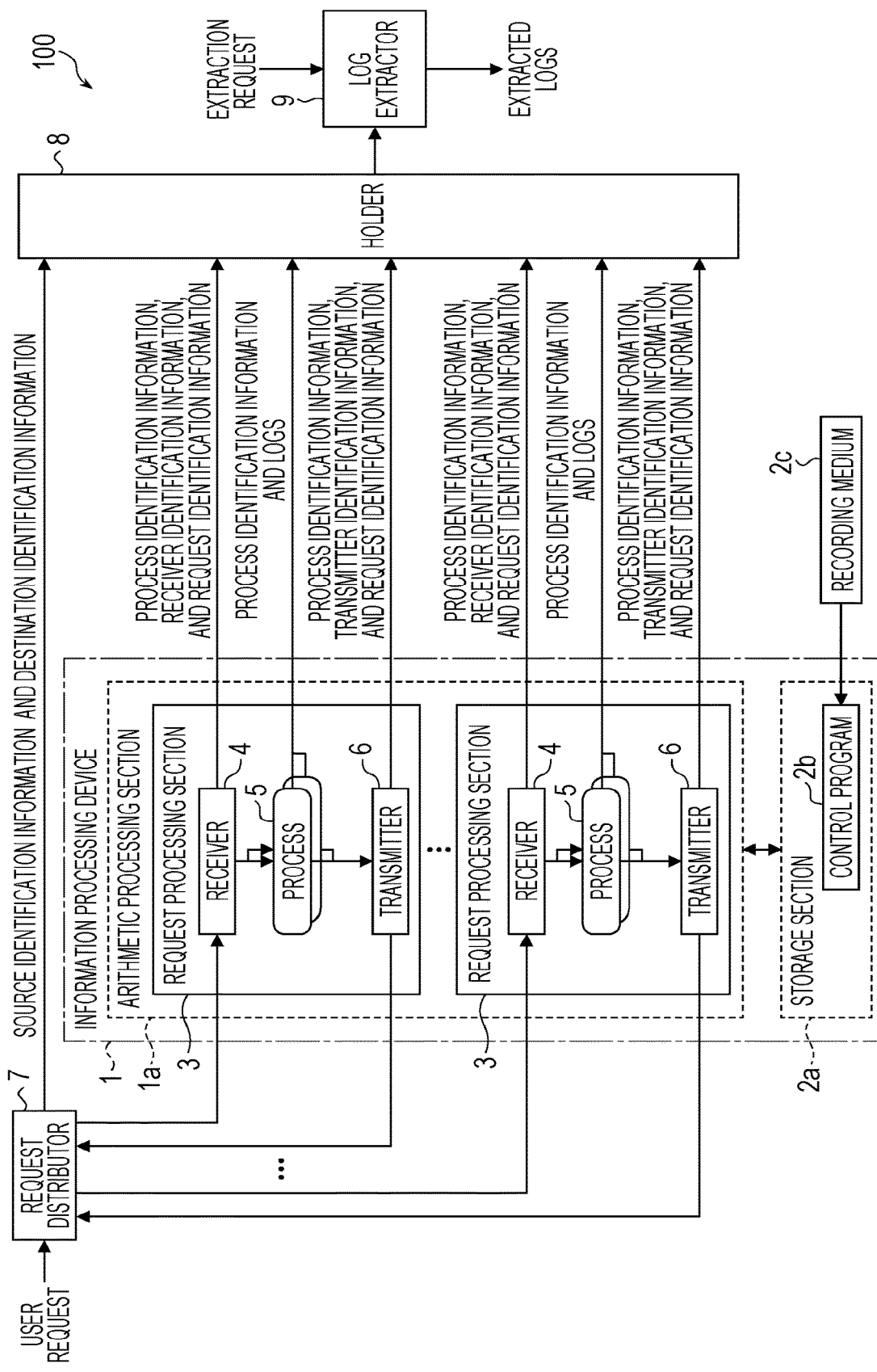
FIG. 1 is a diagram illustrating an information processing system according to an embodiment.

FIG. 1 illustrates an information processing system according to an embodiment. The information processing system 100 illustrated in FIG. 1 includes an information processing device 1, a request distributor 7, a holder 8, and a log extractor 9. The information processing device 1 includes an arithmetic processing section 1a and a storage section 2a. The information processing system 100 may include multiple information processing devices 1. The arithmetic processing section 1a executes a control program held in the storage section 2a, thereby functioning as multiple request processing sections 3, each of which executes a predetermined function by processing a request. For example, the control program is stored in a recording medium 2c such as a compact disc read only memory (CD-ROM), a digital versatile disc (DVD), or a Universal Serial Bus (USB) memory and transferred from the recording medium 2c to the storage section 2a.

Each of the request processing sections 3 includes a receiver 4 for receiving a request from the request distributor 7, a process 5 generated by the receiver 4, and a transmitter 6 for transmitting a next request generated by the process 5 to the request distributor 7. The multiple request processing sections 3 execute a process for a collection of multiple functions by transmitting a request from each of the multiple request processing sections 3 to another one of the request processing sections 3 via the request distributor 7. Specifically, the information processing system 100 may provide so-called microservices.

The receivers 4 generate, based on the reception of requests, processes 5 for executing processes and output process identification information identifying the generated processes 5 and receiver identification information identifying the receivers 4 in order to cause the output process identification information and the output receiver identification information to be stored in the holder 8. If request identification information identifying the requests is included in the requests, the receivers 4 output the request identification information in order to cause the output request identification information to be stored in the holder 8.

The processes 5 execute the processes corresponding to the requests, output next requests or responses to the transmitters 6 based on the processes, and output process identification information identifying the processes 5 and logs of events or the like that have occurred due to the execution of the processes in order to cause the process identification information and the logs to be stored in the holder 8.

The transmitters 6 add request identification information to the next requests output from the processes 5 and transmit the next requests having the request identification information added thereto to the request distributor 7. In addition, the transmitters 6 output the process identification information identifying the processes 5 that have output the next requests, the request identification information, and transmitter identification information identifying the transmitters 6 in order to cause the process identification information, the request identification information, and the transmitter identification information to be stored in the holder 8.

The request identification information is not generated by the processes 5 that that execute the processes corresponding to the requests and is generated by the transmitters 6. Thus, the processes 5 (or application programs) may be executed in the information processing device 1 without adding a function of generating the request identification information to the processes 5. In other words, the processes 5 may be executed in the information processing device 1 while maintaining the versatility of the processes 5, and it may be possible to suppress a reduction in the availability and portability of the so-called microservices.

The request distributor 7 transmits a user request received from a user terminal (not illustrated) or the like or a next request received from any of the transmitters 6 of the request processing sections 3 to any of the request processing sections 3 in order to cause the request processing section 3 to process the transmitted request. In addition, the request distributor 7 outputs source information identifying a request processing section 3 serving as a source of a request or the like, destination information identifying a request processing section 3 serving as a destination of the request, and request identification information identifying the request to the holder 8 in order to cause the source information, the destination information, and the request identification information to be stored in the holder 8. The request distributor 7 may be distributed in the multiple information processing devices 1. In this case, functions of the request distributor 7 are achieved by causing arithmetic processing sections 1a of the information processing devices 1 to execute a control program. The control program for achieving the functions of the distributor 7 may be included in the control program for generating the request processing sections 3 or may be separated from the control program for generating the request processing sections 3.

The receiver identification information, the process identification information, the request identification information, the transmitter identification information, the source identification information, and the destination identification information are examples of identification information. The receivers 4, the transmitters 6, and the request distributor 7 may write the identification information directly in the holder 8 or may write the identification information in the holder 8 via an information writing section or the like. Similarly, the processes 5 may write the identification information and the logs directly in the holder 8 or may write the identification information and the logs in the holder 8 via the information writing section or the like.

The holder 8 holds identification information identifying the request processing sections that have processed requests and holds logs of processes executed based on the requests. The log extractor 9 references identification information held in the holder 8 based on an extraction request and extracts logs from the holder 8 in the order in which the requests have been processed.

Figure 2:
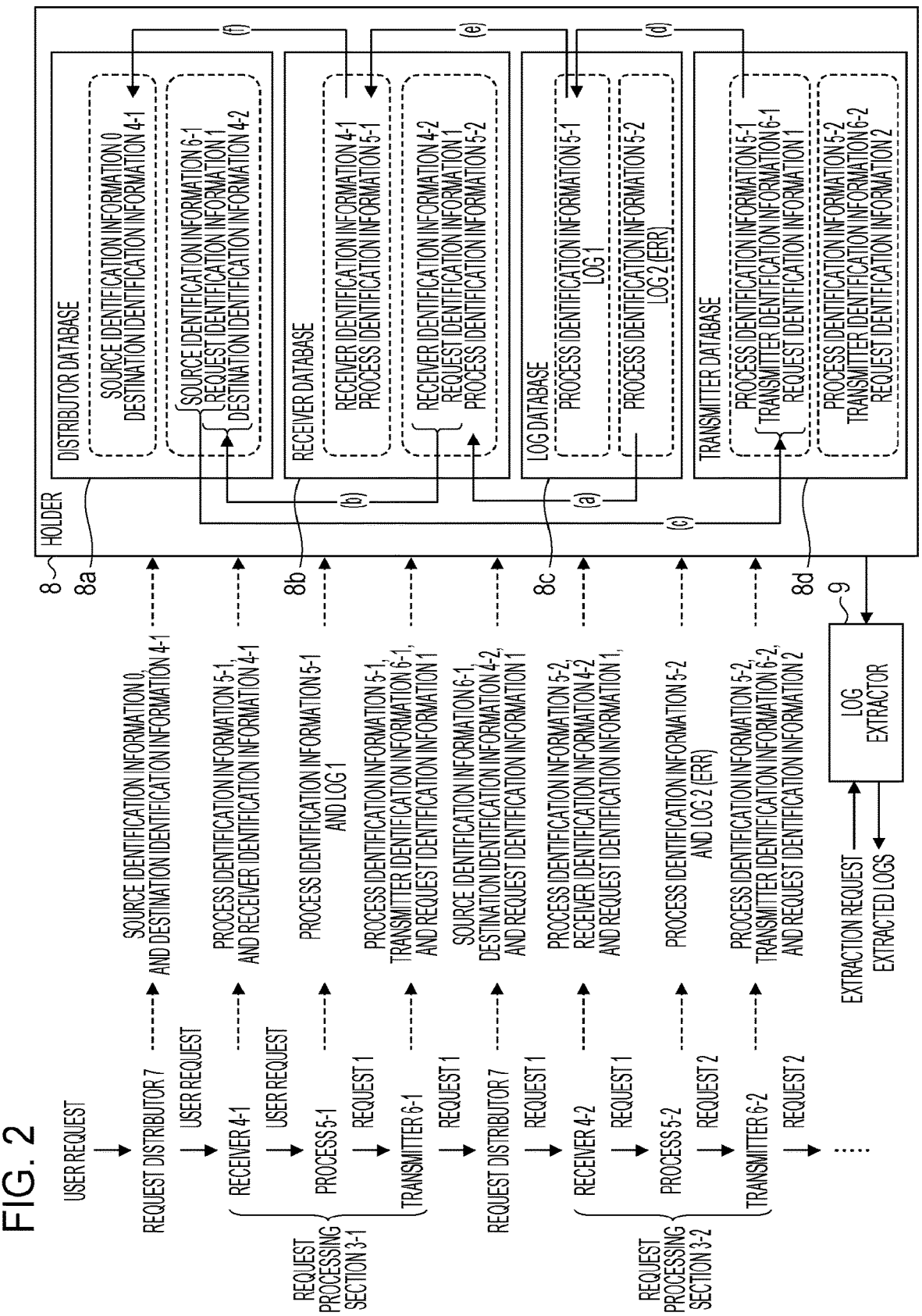
FIG. 2 is a diagram illustrating an example of operations of the information processing system illustrated in FIG. 1.

FIG. 2 illustrates an example of operations of the information processing system 100 illustrated in FIG. 1. Operations illustrated in FIG. 2 are executed by the control program that achieves the request processing sections 3, the control program that achieves the request distributor 7, and a control program that achieves the log extractor 9, for example. In other words, FIG. 2 illustrates an example of a control method of the information processing system 100 and an example of a control program to be executed in the information processing system 100. In the example illustrated in FIG. 2, branch numbers "0", "1", and "2" are added to the request processing sections 3, the receivers 4, the processes 5, the transmitters 6, identification information, and logs in order to clarify the following description.

Regions for storing information received from the request distributor 7, the receivers 4, the processes 5, and the transmitters 6 are allocated to the holder 8. For example, identification information output by the request distributor 7 is held in a distributor database 8a, while identification information output by the receivers 4 is held in a receiver database 8b. In addition, logs and identification information that have been output by the processes 5 are held in a log database 8c, while identification information output by the transmitters 6 is held in a transmitter database 8d. The distributor database 8a includes multiple distributor entries indicated by broken-line frames, while the receiver database 8b includes multiple receiver entries indicated by broken-line frames. The log database 8c includes multiple log entries indicated by broken-line frames, while the transmitter database 8d includes multiple transmitter entries indicated by broken-line frames.

First, the request distributor 7 receives a user request and transmits the received user request to a receiver 4-1 of a request processing section 3-1. The request distributor 7 causes source identification information 0 identifying a user terminal serving as a source of the user request and destination identification information 4-1 identifying the receiver 4-1 included in the request processing section 3-1 and serving as a destination of the request to be stored in the distributor database 8a included in the holder 8.

The receiver 4-1 receives the user request, generates a process 5-1 based on the reception of the user request, and causes process identification information 5-1 identifying the process 5-1 and receiver identification information 4-1 identifying the receiver 4-1 to be stored in the receiver database 8b included in the holder 8. The process 5-1 outputs a next request 1 to a transmitter 6-1 of the request processing section 3-1 based on a process corresponding to the user request. In addition, the process 5-1 causes the process identification information 5-1 identifying the process 5-1 and a log 1 that has occurred due to the execution of the process to be stored in the log database 8c included in the holder 8.

The transmitter 6-1 adds request identification information 1 to the next request 1 received from the process 5-1 and transmits the next request 1 having the request identification information 1 added thereto to the request distributor 7. In addition, the transmitter 6-1 causes the process identification information 5-1 identifying the process 5-1 that has output the next request 1, transmitter identification information 6-1 identifying the transmitter 6-1, and the request identification information 1 to be stored in the transmitter database 8d included in the holder 8.

The request distributor 7 receives the request 1 including the request identification information 1 and transmits the received request 1 to a receiver 4-2 of a request processing section 3-2. The request distributor 7 causes source identification information 6-1 identifying the transmitter 6-1 serving as a source of the request 1 and included in the request processing section 3-1 and destination identification information 4-2 identifying the receiver 4-2 serving as a destination of the request 1 to be stored in the distributor database 8a of the holder 8. In addition, the request distributor 7 causes the request identification information 1 to be stored in the distributor database 8a of the holder 8.

The receiver 4-2 receives the request 1, generates a process 5-2 based on the reception of the request 1, and causes process identification information 5-2 identifying the process 5-2, receiver identification information 4-2 identifying the receiver 4-2, and the request identification information 1 to be stored in the receiver database 8b of the holder 8. The process 5-2 outputs a next request 2 to a transmitter 6-2 of the request processing section 3-2 based on a process corresponding to the request 1. In addition, the process 5-2 causes the process identification information 5-2 identifying the process 5-2 and a log 2 generated due to the execution of the process to be stored in the log database 8c of the holder 8. For example, the log 2 is an error log indicating the occurrence of an error ERR. The transmitter 6-2 adds request identification information 2 to the next request 2 and transmits the request 2 having the request identification information 2 added thereto to the request distributor 7. In addition, the transmitter 6-2 causes the process identification information 5-2 identifying the process 5-2 that has output the next request 2, transmitter identification information 6-2 identifying the transmitter 6-2, and the request identification information 2 to be stored in the transmitter database 8d of the holder 8.

The log extractor 9 references the identification information held in the holder 8 based on a request to extract the logs corresponding to a series of the requests that have caused the occurrence of the error log 2 (ERR) and extracts the logs from the holder 8 according to the following procedure.

First, the log extractor 9 identifies a receiver entry included in the receiver database 8b and holding the same information as the process identification information 5-2 held together with the error log 2 (ERR) in a log entry of the log database 8c ((a) illustrated in FIG. 2). If the request identification information 1 is held in the identified receiver entry, the log extractor 9 uses the receiver identification information 4-2 and the request identification information 1 to identify a distributor entry of the distributor database 8a. Specifically, the log extractor 9 identifies the distributor entry holding the same information (or the source identification information 4-2 and the request identification information 1) as the receiver identification information 4-2 and the request identification information 1 ((b) illustrated in FIG. 2).

If the request identification information 1 is held in the identified distributor entry, the log extractor 9 uses the source identification information 6-1 and the request identification information 1 to identify a transmitter entry of the transmitter database 8d. Specifically, the log extractor 9 identifies the transmitter entry holding the same information (or the transmitter identification information 6-1 and the request identification information 1) as the source identification information 6-1 held in the identified distributor entry and the request identification information 1 held in the identified distributor entry ((c) illustrated in FIG. 2). The log extractor 9 identifies a log entry included in the log database 8c and holding the same information as the process identification information 5-1 held in the identified transmitter entry and extracts the log 1 held in the identified log entry ((d) illustrated in FIG. 2).

Next, the log extractor 9 identifies a receiver entry holding the same information as the process identification information 5-1 held together with the log 1 in the log entry ((e) illustrated in FIG. 2). Since request identification information is not held in the identified receiver entry, the log extractor 9 uses only the receiver identification information 4-1 to identify a distributor entry ((f) illustrated in FIG. 2). If the request identification information 1 is not held in the identified distributor entry, identification information held in the identified distributor entry is not based on the next requests transmitted by the transmitters 6. In other words, if the request identification information 1 is not held in the identified distributor entry, the identification information held in the identified distributor entry is based on the request (user request in this example) from the external located outside the information processing system 100. Thus, the log extractor 9 determines that the log extractor 9 has extracted all the logs corresponding to the series of requests related to the occurrence of the error log 2 (ERR), and the extractor 9 terminates an extraction process.

In this manner, as illustrated in FIG. 2, the log extractor 9 traces, based on the identification information held in the holder 8, the flow of the requests in the order opposite to the order in which the requests have been processed and extracts the logs held in the log database 8a. In FIG. 2, the distributor database 8a and the receiver database 8b hold the request identification information. Thus, even if the same source identification information 4-1 is held in the distributor database 8a multiple times, the log extractor 9 may identify the request distributor 7 that has transmitted the request to the receiver 4. In addition, if the log extractor 9 identifies a distributor entry that is included in the distributor database 8a and in which request identification information is not held, the log extractor 9 may determine the completion of the extraction.

Figure 3:
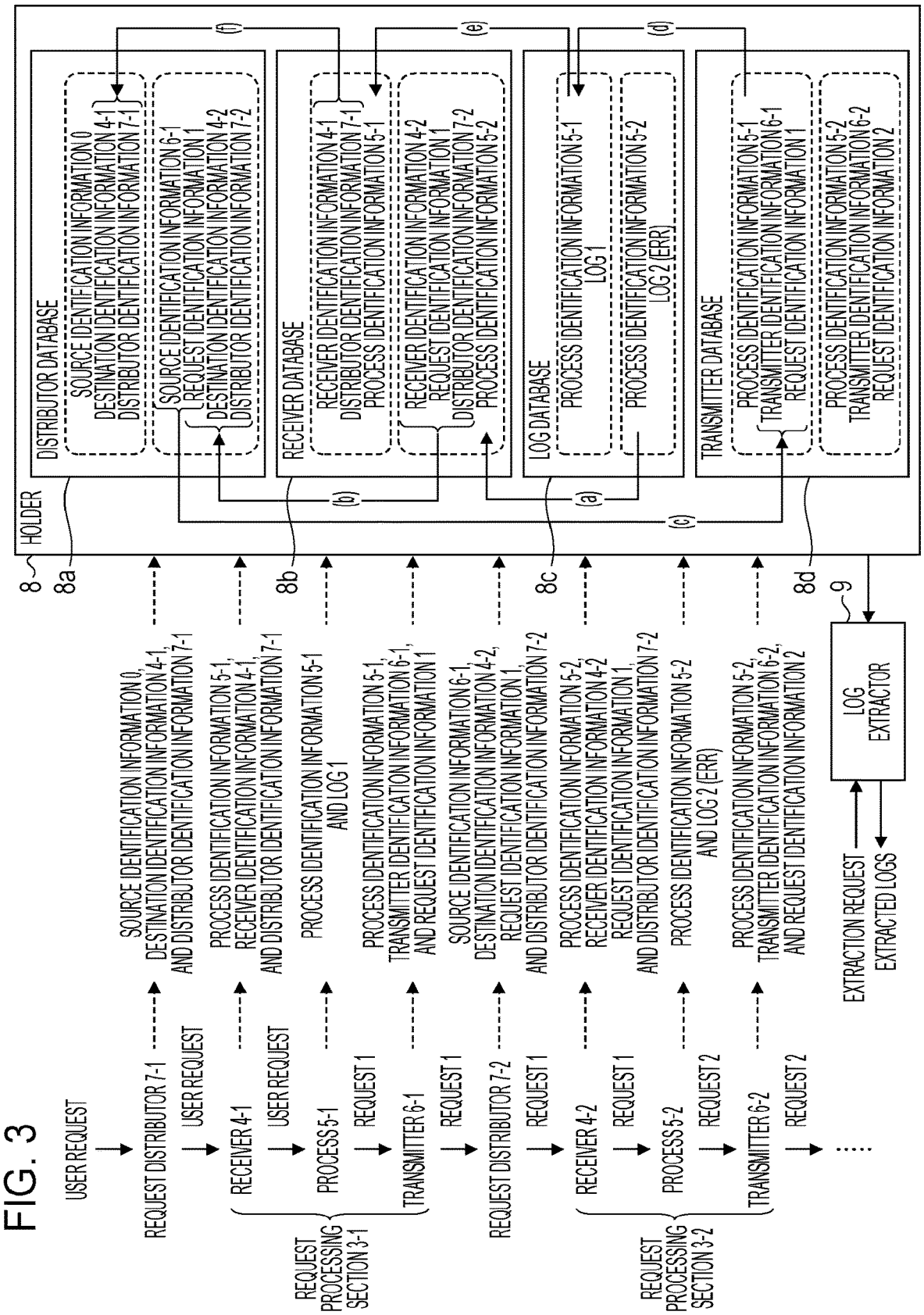
FIG. 3 is a diagram illustrating another example of operations of the information processing system illustrated in FIG. 1.

FIG. 3 illustrates another example of operations of the information processing system 100 illustrated in FIG. 1. A detailed description of processes that are the same as or similar to those described with reference to FIG. 2 is omitted. In this example, the information processing system 100 includes a plurality of request distributors 7 (7-1 and 7-2). Upon receiving a user request or receiving a request from a transmitter 6, each of the request distributors 7 causes source identification information, destination identification information, and distributor identification information (7-1 or 7-2) identifying the request distributor 7 to be stored in the distributor database 8a of the holder 8. Upon receiving the request from the request distributor 7, each of the receivers 4 causes receiver identification information, process identification information, and the distributor identification information to be stored in the receiver database 8b of the holder 8.

Upon receiving request identification information from a transmitter 6, each of the request distributors 7 causes the request identification information to be stored in the holder 8. Upon receiving request identification information from a request distributor 7, each of the receivers 4 causes the request identification information to be stored in the holder 8. Since each of the transmitters 6 causes request identification information to be stored in the holder 8, the log extractor 9 may determine the completion of the extraction based on the request identification information, like the example illustrated in FIG. 2. The transmitters 6 may omit the storage of the request identification information in the holder 8.

The log extractor 9 operates in the same manner as the operations described with reference to FIG. 2 based on the request to extract the logs corresponding to the series of requests related to the occurrence of the error log 2 (ERR). An operation indicated by (a) in FIG. 3 is the same as the operation indicated by (a) in FIG. 2, while an operation indicated by (c) in FIG. 3 is the same as the operation indicated by (c) in FIG. 2. An operation indicated by (d) in FIG. 3 is the same as the operation indicated by (d) in FIG. 2, while an operation indicated by (e) in FIG. 3 is the same as the operation indicated by (e) in FIG. 2. However, an operation of extracting a log using distributor identification information in the example illustrated in FIG. 3 is different from that described with reference to FIG. 2.

As indicated by (b) in FIG. 3, if the log extractor 9 uses identification information held in a receiver entry to identify a distributor entry of the distributor database 8a, the log extractor 9 uses the receiver identification information 4-2, the request identification information 1, and distributor identification information 7-2 identifying the request distributor 7-2. Alternatively, as indicated by (f) in FIG. 3, if the log extractor 9 uses identification information held in a receiver entry to identify a distributor entry of the distributor database 8a, the log extractor 9 uses the receiver identification information 4-1 and distributor identification information 7-1 identifying the request distributor 7-1. Thus, in the case where the information processing system 100 includes the plurality of request distributors 7, the log extractor 9 may identify a request distributor 7 that has transmitted a request to a request processing section 3. As a result, the log extractor 9 may automatically extract the logs corresponding to the series of requests related to the occurrence of the error log 2 (ERR) while tracing the flow of the requests.

In the embodiment described with reference to FIGS. 1 to 3, the log extractor 9 may automatically extract logs of processes sequentially executed by the multiple request processing sections 3 based on a request. In addition, if the same source identification information 4-1 stored multiple times is held in the distributor database 8a, the log extractor 9 references request identification information held in the holder 8 and identifies a request distributor 7 that has transmitted a request to a receiver 4. The log extractor 9 references request identification information held in the distributor database 8a, thereby determining the completion of the log extraction operation. In the case where the information processing system 100 includes the multiple request distributors 7, the log extractor 9 may identify, based on distributor identification information, a request distributor 7 that has transmitted a request to a request processing section 3.

Figure 4:
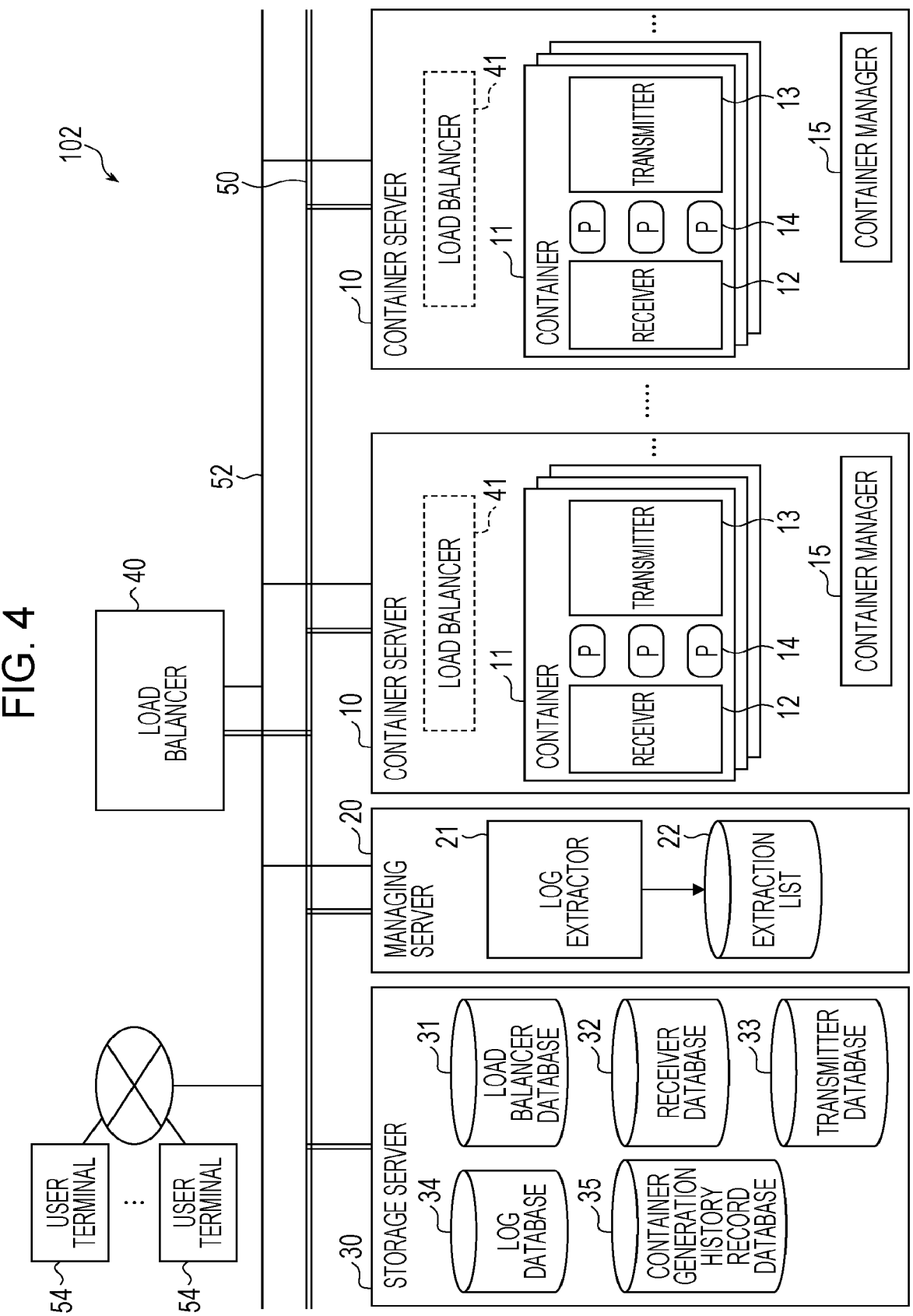
FIG. 4 is a diagram illustrating an information processing system according to another embodiment.

FIG. 4 illustrates an information processing system according to another embodiment. Elements that are the same as or similar to the elements described in the embodiment with reference to FIG. 1 are indicated by the same reference numbers as those illustrated in FIG. 1, and a detailed description thereof is omitted.

Figure 5:
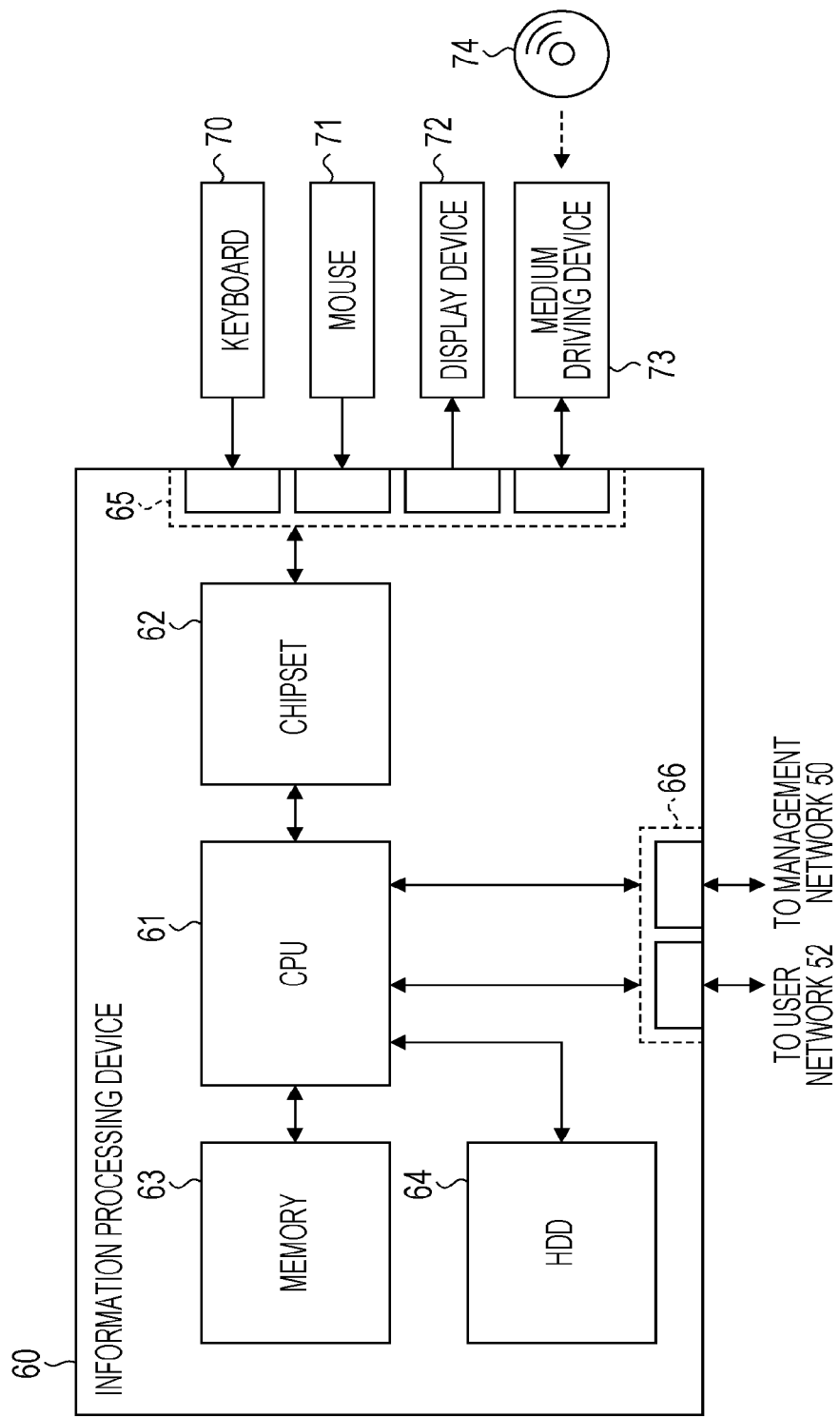
FIG. 5 is a diagram illustrating an example of each of information processing devices to be used as container servers, a managing server, a storage server, and a load balancer that are illustrated in FIG. 4.

The information processing system 102 illustrated in FIG. 4 includes multiple container servers 10, a managing server 20, a storage server 30, and a load balancer 40 that are connected to a management network 50. The container servers 10, the managing server 20, and the load balancer 40 are connected to a user network 52 connected to user terminals 54 that are personal computers or the like. The container servers 10, the managing server 20, the storage server 30, and the load balancer 40 are examples of the information processing device. The storage server 30 is an example of the holder. An example of information processing devices that are used as the container servers 10, the managing server 20, the storage server 30, and the load balancer 40 is illustrated in FIG. 5.

Instead of the load balancer 40, virtual load balancers 41 may be built as indicated in the container balancers 10 by broken-line frames. In this case, the information processing system 102 does not include the physical load balancer 40, and the virtual load balancers 41 built in the container servers 10 collaborate with each other to achieve functions of the load balancer 40. An example in which the virtual load balancers 41 are executed is described below. The load balancers 41 are an example of the request distributors.

Each of the container servers 10 is installed for a respective processing function (service) and includes a container 11 and a container manager 15. The containers 11 are units of execution environments for application programs. The container managers 15 manage the generation, deletion, and the like of containers 11. The containers 11 and the container managers 15 are generated by causing arithmetic processing devices that are included in the container servers 10 and are CPUs or the like to execute virtualization programs. With a container-based virtualization technique using the containers 11, the execution environments for the application programs may be achieved on a single operating system (OS) installed in each of the container servers 10. Hereinafter, the application programs are also referred to as applications.

Each of the containers 11 includes a receiver 12 that receives a request and a response and a transmitter 13 that transmits a request and a response. Each of the containers 11 generates a process 14 (indicated by a symbol P) for executing an application based on a request received by a receiver 12 of the container 11 and executes a process of the application. The processes 14 included in the containers 11 are executed independently of each other. If each of the containers 11 executes, based on the result of executing a process, a process of another application, the container 11 generates a request and transmits the generated request from a transmitter 13 of the container 11 to another container 11 that executes the other application. In addition, each of the containers 11 transmits, as a response, the result of executing a process from a transmitter 13 of the container 11 to a container server 10 that is a source of a request. The containers 11 are an example of the request processing sections that process requests.

The containers 11 execute a process for a collection of multiple functions independent of each other by sequentially transmitting requests to other containers 11 via the load balancers 41. In other words, the information processing system 100 may provide the so-called microservices. Specifically, since the numbers of containers 11 are increased or reduced for functions based on loads applied to the functions achieved by the container servers 10, the size of the system may be easily changed based on the loads, compared with a system that executes a large process while packaging multiple functions.

The container managers 15 have a function of managing the generation and deletion of a container 11 and a function of causing a history record indicating the generation of a container 11 to be stored in the storage server 30. The container managers 15 also have a function of causing information indicating the flow of requests transmitted and received between the receivers 12 and the transmitters 13 to be stored in the storage server 30. The container managers 15 further have a function of causing information corresponding to events generated by the processes 14 to be stored in the storage server 30. Each of the container managers 15 is an example of the information writing section.

The managing server 20 manages operations of the entire information processing system 102. In addition, for example, the managing server 20 has a log extractor 21 that searches information stored in the storage server 30 and extracts logs related to a log indicating an error, for example. Functions of the log extractor 21 are achieved by a control program executed by the managing server 20. The functions of the log extractor 21 may be achieved by hardware of the managing server 20.

The storage server 30 includes a load balancer database 31, a receiver database 32, a transmitter database 33, a log database 34, and a container generation history record database 35. The load balancer database 31 stores identification information corresponding to requests transmitted and received by the load balancers 41 of the container servers 10. The receiver database 32 stores identification information corresponding to requests transmitted and received by the receivers 12 of the containers 11 of the container servers 10. The transmitter database 33 stores identification information corresponding to requests transmitted and received by the transmitters 13 of the containers 11 of the container servers 10.

Figures 12, 13:
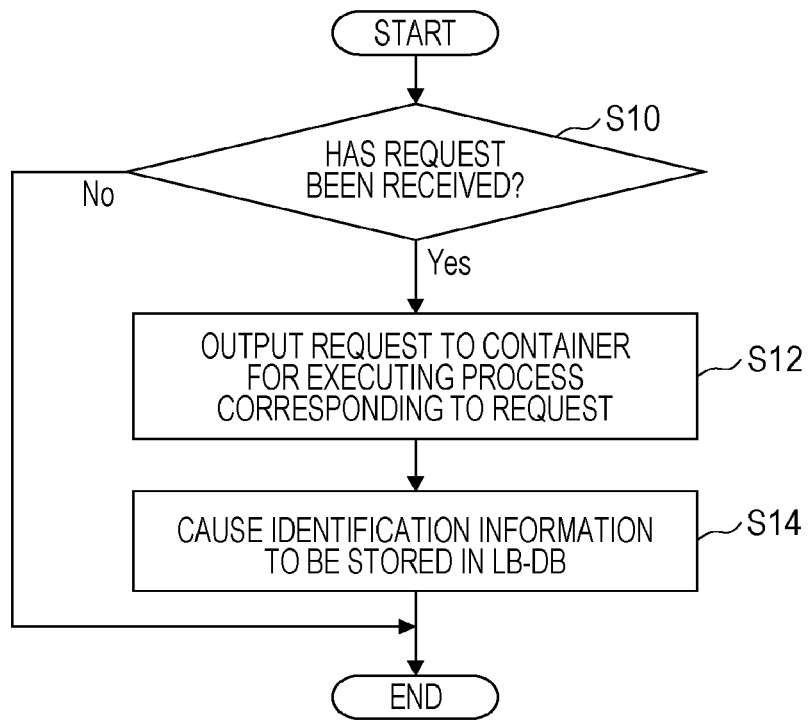
FIG. 12 is a diagram illustrating an example of information stored in a container generation history record database illustrated in FIG. 7.
FIG. 13 is a diagram illustrating an example of operations of each of load balancers illustrated in FIG. 4.

The log database 34 stores logs indicating events generated by the processes 14 executed by the containers 11 of the container servers 10 and stores identification information identifying the processes 14. The container generation history record database 35 stores history records indicating the generation of the containers 11 of the container servers 10. An example of the information stored in the load balancer database 31, the receiver database 32, the transmitter database 33, and the log database 34 is illustrated in FIGS. 8 and 11. An example of the information stored in the container generation history record database 35 is illustrated in FIG. 12. The storage server 30 may store other data processed and to be processed by the information processing system 102.

FIG. 5 illustrates an example of each of the information processing devices that are used as the container servers 10, the managing server 20, the storage server 30, and the load balancer 40 that are illustrated in FIG. 4. An information processing device 60 illustrated in FIG. 5 includes a CPU 61, a chipset 62, and a memory 63 that are mounted on a motherboard included in the information processing device 60 and includes a hard disk drive (HDD) 64 connected to a backplane (not illustrated) mounted on the motherboard, for example. In addition, the information processing device 60 includes an input and output interface section 65 connected to the CPU 61 via the chipset 62 and a communication interface section 66 connected to the CPU 61.

For example, the input and output interface section 65 includes multiple ports, each of which is connected to a keyboard 70, a mouse 71, a display device 72, a medium driving device 73, or the like. A recording medium 74 that is a CD-ROM, a DVD, or the like and stores various control programs to be executed by the CPU 61 is attachable to the medium driving device 73.

After the control programs stored in the recording medium 74 are transferred to the HDD 64, the control programs may be stored in the memory 63 and executed by the CPU 61. The input and output interface section 65 may include USB ports. In this case, the various control programs stored in a USB memory are stored in the memory 63 via the HDD 64.

The communication interface section 66 includes multiple ports that are connected to the management network 50 and the user network 52.

Figure 6:
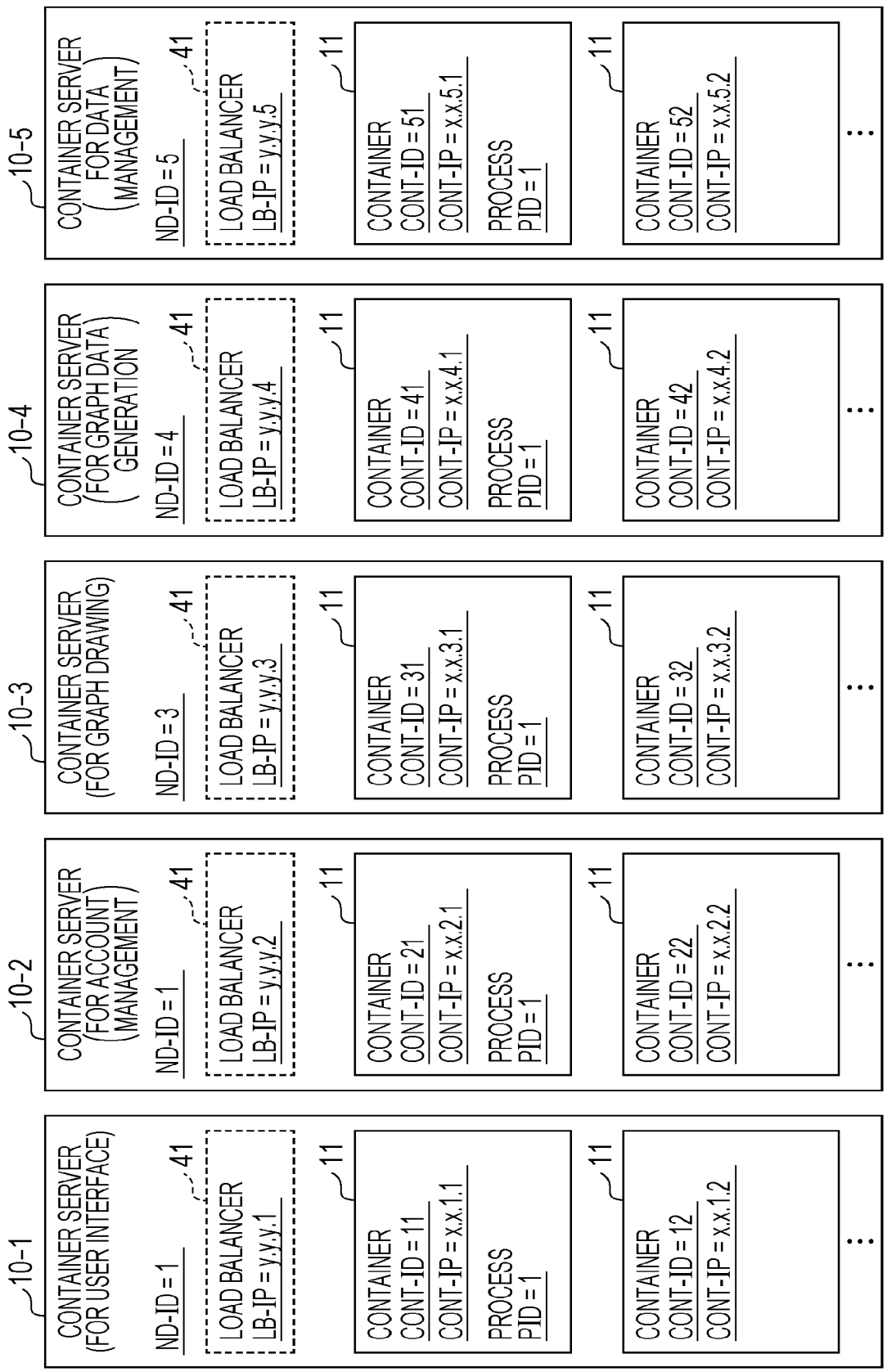
FIG. 6 is a diagram illustrating an example of identification information that is assigned to and identifies various elements of the container servers illustrated in FIG. 4.

FIG. 6 illustrates an example of identification information that is assigned to and identifies the elements of the container servers 10 illustrated in FIG. 4. For example, the container servers 10 illustrated in FIG. 4 are provided for the multiple functions (for user interface, account management, graph drawing, graph data generation, and data management).

Hereinafter, a container server 10 for the user interface is referred to as container server 10-1, a container server 10 for the account management is referred to as container server 10-2, a container server 10 for the graph drawing is referred to as container server 10-3, a container server 10 for the graph data generation is referred to as container server 10-4, and a container server 10 for the data management is referred to as container server 10-5.

Specific identification information ND-ID (identification) that identifies the container servers 10 is assigned to the container servers 10 (nodes). Specific identification information LD-IP that identifies the load balancers 41 is assigned to the load balancers 41 of the container servers 10. Specific identification information CONT-IP and CONT-ID that identifies the containers 11 is assigned to the containers 11. In the example illustrated in FIG. 6, in order to clarify the description, different identification numbers CONT-ID are assigned to the containers 11, respectively. Identification numbers CONT-ID assigned to containers 11 included in different container servers 10, however, may overlap each other. Specific identification information PID is assigned to and identifies the processes 14 generated by and included in the containers 11.

Hereinafter, the identification information ND-ID is also referred to as node numbers ND-ID, the identification information LD-IP is also referred to as Internet Protocol (IP) addresses LB-IP, the identification information CONT-IP is also referred to as IP addresses CONT-IP, the identification information CONT-ID is also referred to as container numbers CONT-ID, and the identification information PID is also referred to as process numbers PID.

Figure 7:
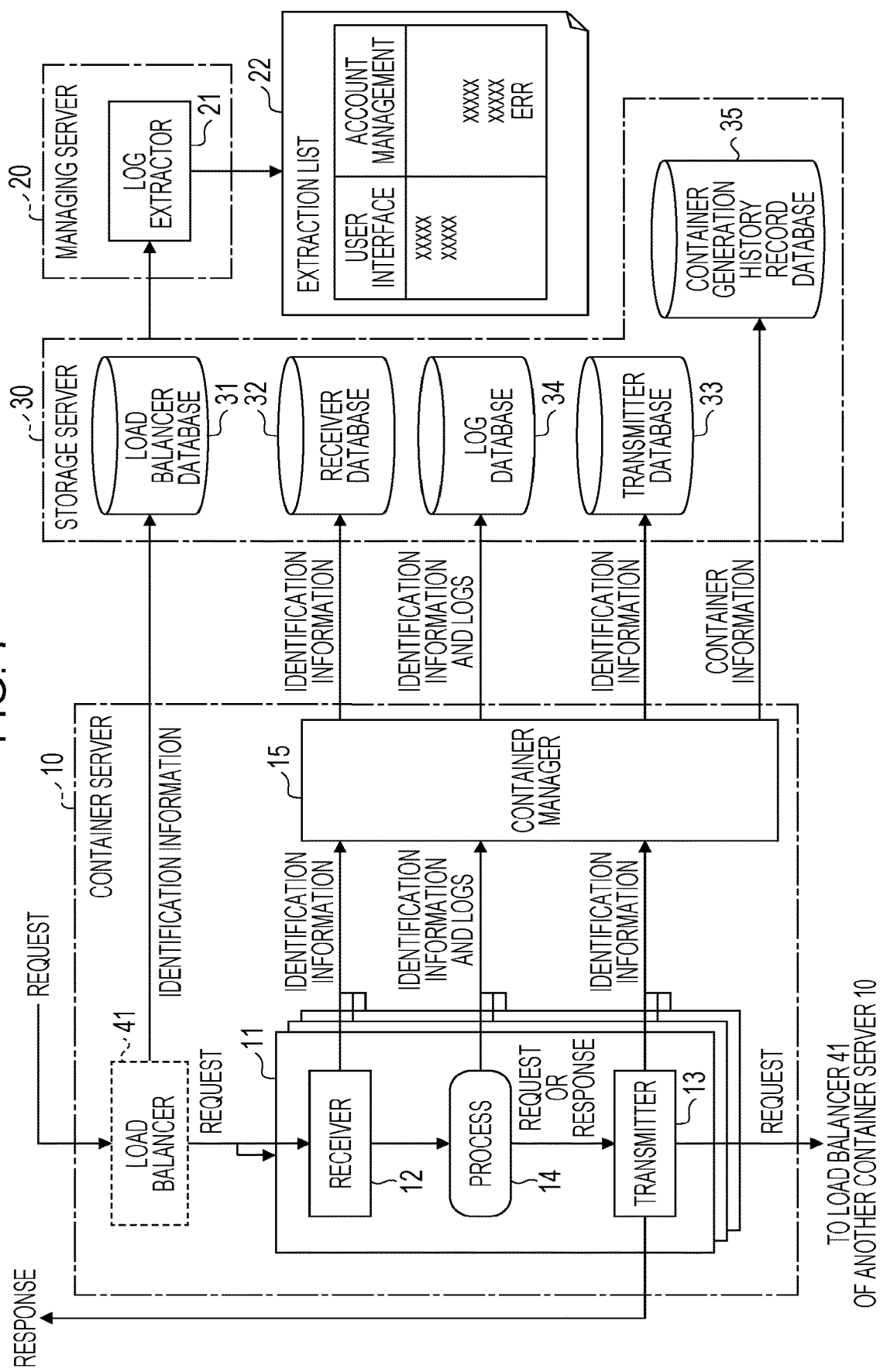
FIG. 7 is a diagram illustrating an example of an overview of a log management operation to be executed by the information processing system illustrated in FIG. 4.

FIG. 7 illustrates an example of an overview of a log management operation to be executed by the information processing system 102 illustrated in FIG. 4.

When a load balancer 41 of any of the container servers 10 receives a request from another container server 10 among the container servers 10, the load balancer 41 determines a container 11 in order to cause the container 11 to process the request and outputs the request to the determined container 11. In addition, the load balancer 41 causes identification information corresponding to the received and transmitted request to be stored in the load balancer database 31. The load balancer 41 of the container server 10 (10-1 illustrated in FIG. 6) for the user interface receives a request from a user terminal 54. The load balancers 41 of the container servers 10 for the account management, the graph drawing, the graph data generation, and the data management receive requests from transmitters 13 of other container servers 10. An example of operations of each of the load balancers 41 is illustrated in FIG. 13. The identification information generated by the load balancer 41 may be stored in the load balancer database 31 via the container manager 15 of the container server 10.

A receiver 12 of the container 11 that has received the request from the load balancer 41 generates a process 14 for executing a process corresponding to the received request. Then, the receiver 12 causes identification information corresponding to the received and transmitted request to be stored in the receiver database 32 via the container manager 15.

The process 14 executes the process corresponding to the request. If the process 14 issues a next request to another container server 10 based on the process corresponding to the request, the process 14 outputs the next request to a transmitter 13 of the container 11. If the process 14 completes the process corresponding to the request, the process 14 outputs a response to the request to the transmitter 13. In addition, the process 14 causes a log of an event or the like that has occurred due to the execution of the process and identification information such as a process number identifying the process 14 to be stored in the log database 34 via the container manager 15. The log and the identification information such as the process number may be output by an existing logger without modification of the process 14.

Figure 14:
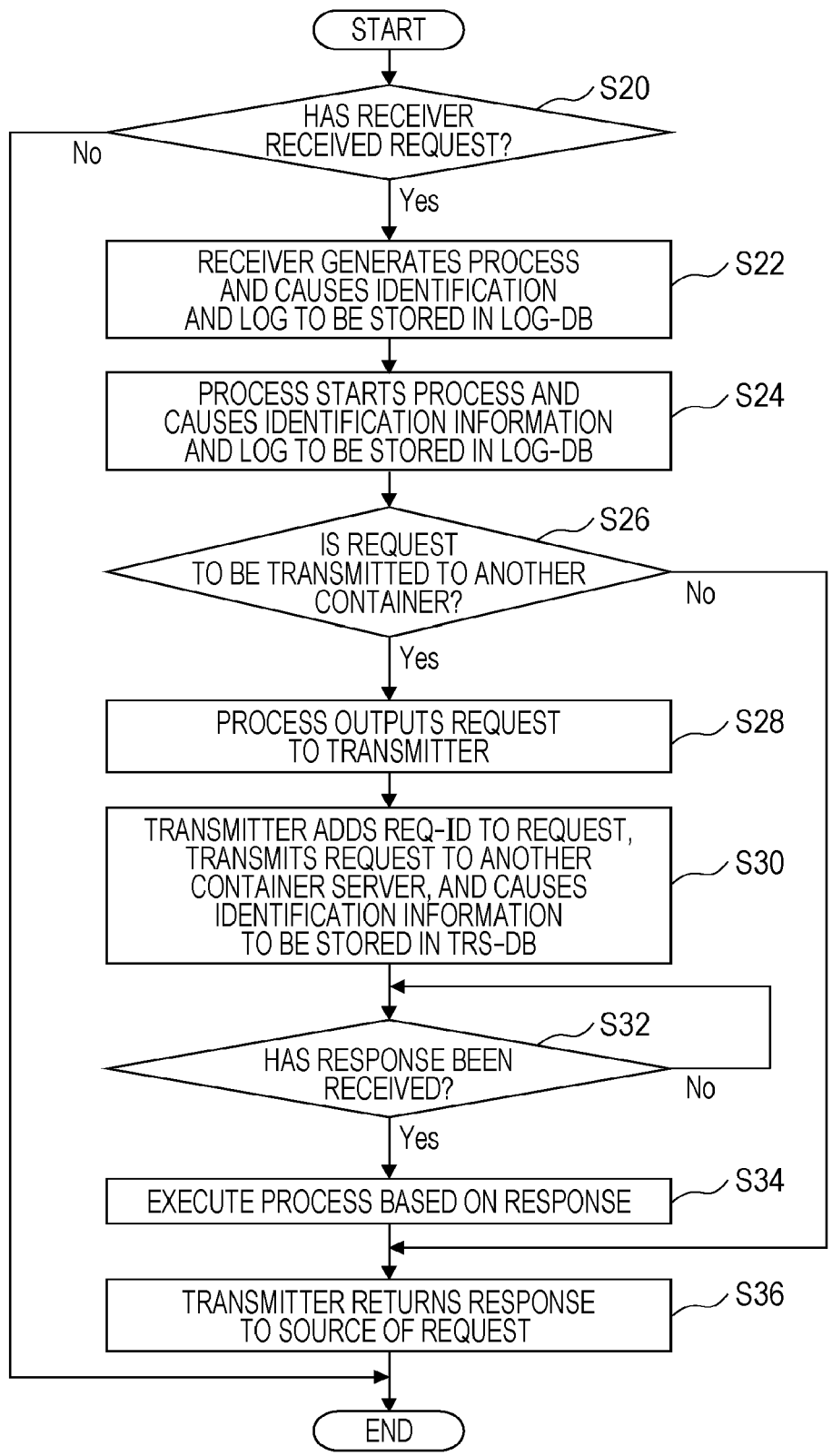
FIG. 14 is a diagram illustrating an example of operations of each of the container servers illustrated in FIG. 4.

The transmitter 13 that has received the request from the process 14 adds identification information identifying the request to the request and transmits the request having the identification information added thereto to a load balancer 41 of the other container server 10. In addition, the transmitter 13 that has received the request from the process 14 causes identification information corresponding to the received and transmitted request to be stored in the transmitter database 33 via the container manager 15. The transmitter 13 that has received the response from the process 14 transmits the response to a source that has issued the request. An example of operations of each of the container servers 10 is illustrated in FIG. 14.

The container manager 15 causes the identification information received from the receiver 12 to be stored in the receiver database 32 and causes the identification information received from the transmitter 13 to be stored in the transmitter database 33. The container manager 15 cause the log received from the process 14 and the identification information received from the process 14 to be stored in the log database 34. Since the container manager 15 controls the writing in the log database 34, the log and the identification information that have been output from the process 14 may be stored in the log database 34 without modification of the process 14 (application program). If the processes 14 cause logs and identification information to be stored directly in the log database 34, the processes 14 are modified in order to recognize a data structure of the log database 34, the versatility of the processes 14 may be reduced, and the availability and portability of the microservices may be reduced.

Figure 15:
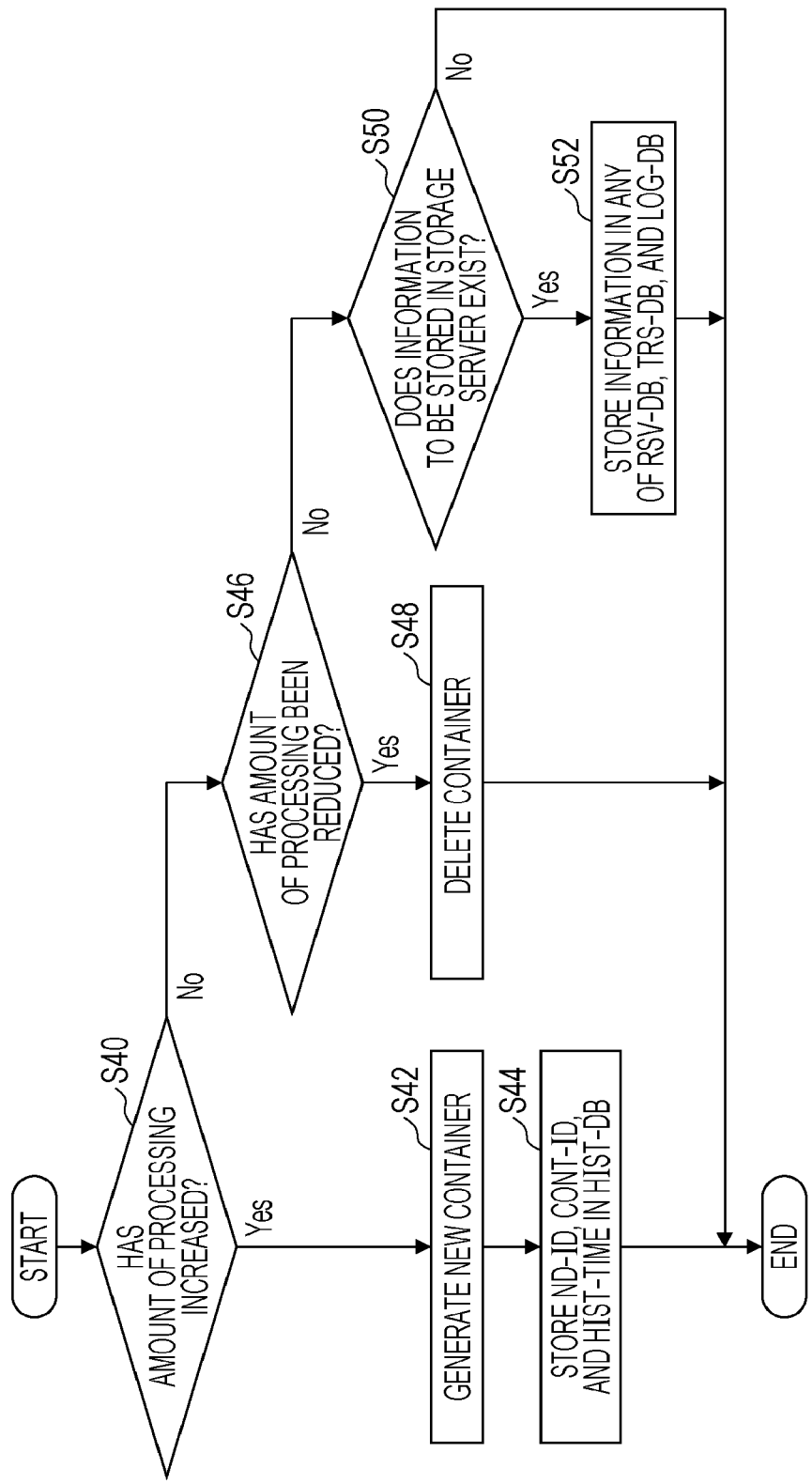
FIG. 15 is a diagram illustrating an example of a container management operation to be executed by each of container managers illustrated in FIG. 4.

If a load of a container server 10 that executes a process corresponding to a request has increased, the container manager 15 of the container server 10 generates a new container 11. If the load of the container server 10 that executes the process corresponding to the request has been reduced, the container manager 15 deletes a container 11. In addition, when the container manager 15 generates the container 11, the container manager 15 causes container information indicating a history record of the generation of the container 11 to be stored in the container generation history record database 35. An example of operations of each of the container managers 15 is illustrated in FIG. 15.

Figure 16:
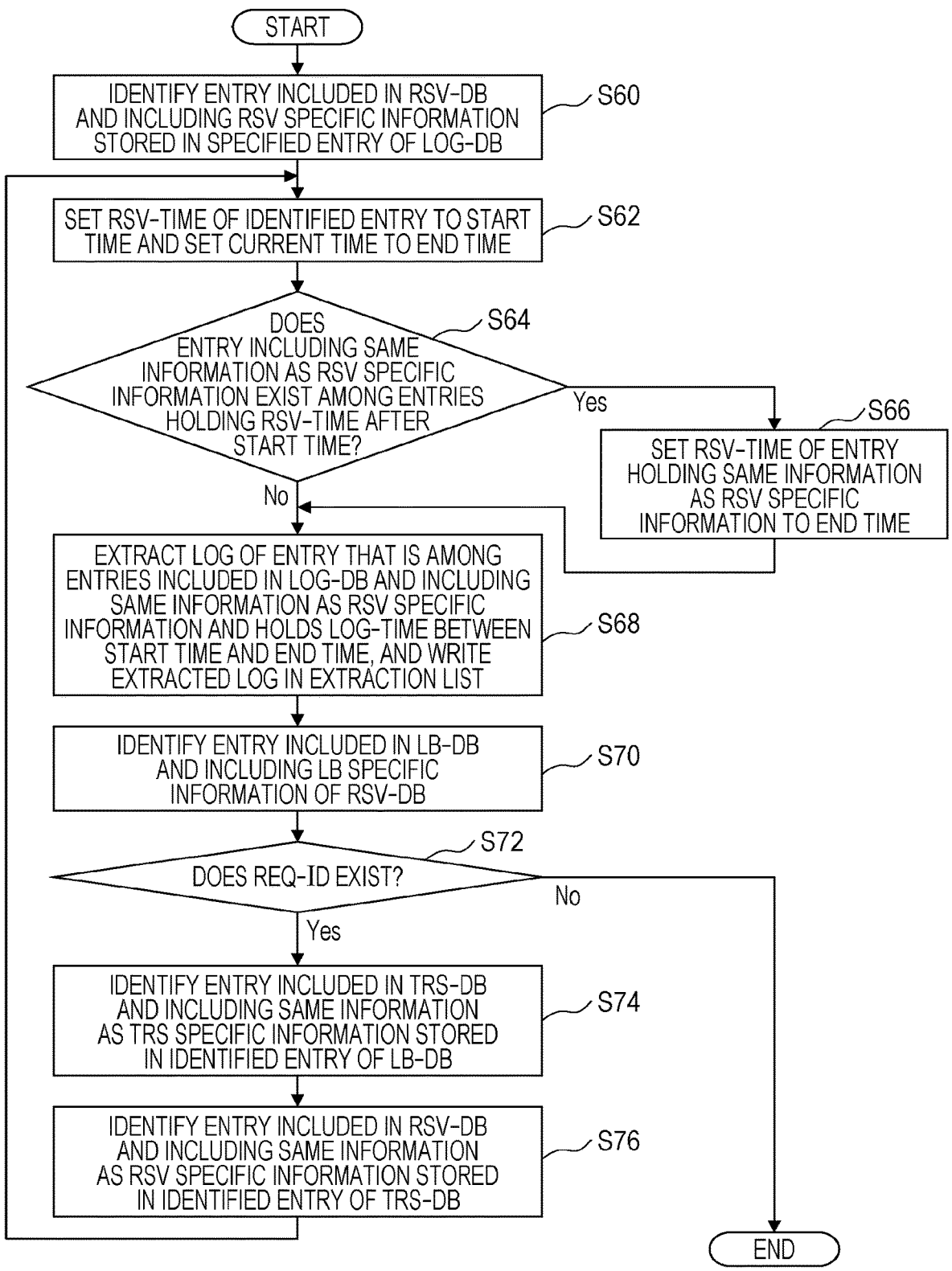
FIG. 16 is a diagram illustrating an example of operations of a log extractor illustrated in FIG. 4.

The log extractor 21 of the managing server 20 references information stored in the storage server 30 based on a log extraction request, extracts a log, and writes the extracted log in an extraction list 22. The extraction list 22 is generated in a storage region such as the memory 63 included in the managing server 20, the HDD 64 included in the managing server 20, or the like. For example, the managing server 20 issues the log extraction request based on an operation, performed by a system administrator of the information processing system 102 or the like, of the managing server 20. An example of a log extraction operation to be executed by the log extractor 21 that has received a log extraction request is illustrated in FIG. 16.

FIG. 8 illustrates an example of information stored in the load balancer database 31, the receiver database 32, the transmitter database 33, and the log database 34 that are illustrated in FIG. 7.

The load balancer database 31 has multiple distributor entries for storing identification information IP(from), REQ-ID, LB-IP, CONT-IP(to), FUNC, and LB-TIME. The identification information IP(from) indicates IP addresses of user terminals 54 that have transmitted requests to load balancers 41 or indicates IP addresses of containers 11 that have transmitted requests to load balancers 41. The identification information REQ-ID indicates request numbers added to requests by transmitters 13. Hereinafter, the identification information IP(from) is also referred to as IP addresses IP(from), and the identification information REQ-ID is also referred to as request numbers REQ-ID.

The identification information REQ-ID indicates request numbers REQ-ID that are specific to containers 11, but two or more of the request numbers REQ-ID may overlap between multiple containers 11. A distributor entry that is among distributor entries holding valid identification information and stores a request number REQ-ID indicates that a load balancer 41 has caused identification information to be stored based on a request from a transmitter 13 of a container 11. A distributor entry that is among the distributor entries holding the valid identification information and does not store a request number REQ-ID indicates that a load balancer 41 has caused identification information to be stored based on a request from a user terminal 54.

The identification information LB-IP indicates IP addresses of load balancers 41 that have caused identification information to be stored in distributor entries. The identification information CONT-IP(to) indicates IP addresses of containers 11 to which the load balancers 41 that have caused the identification information to be stored in the distributor entries have output requests. The identification information FUNC indicates the functions to be executed by the container servers 10 including the load balancers 41 that have caused the identification information to be stored in the distributor entries. Hereinafter, the identification information FUNC is also referred to as functions FUNC.

For example, in a field for the functions FUNC in each of the distributor entries, "UI" indicating the user interface, "ACCNT" indicating the account management, "GDRW" indicating the graph drawing, "GGEN" indicating the graph data generation, or "DATAM" indicating the data management is stored. The information stored in the field for the functions FUNC may be character strings or may be codes. The identification information LB-TIME indicates time when the load balancers 41 have output the requests to the containers 11. Hereinafter, the identification information LB-TIME is also referred to as time LB-TIME.

The receiver database 32 has multiple receiver entries for storing identification information LB-IP(from), CONT-IP, REQ-ID, ND-ID, CONT-ID, PID(to), and RSV-TIME. Hereinafter, the identification information RSV-TIME is also referred to as time RSV-TIME. The identification information LB-IP(from) indicates the IP addresses of the load balancers 41 that have output requests to receivers 12. The identification information CONT-IP indicates IP addresses of containers 11 including the receives 12 that have received the requests. The identification information REQ-ID indicates request numbers identifying the requests received by the receivers 12. The identification information ND-ID indicates node numbers identifying the container servers 10 including the receivers 12 that have received the requests. The identification information CONT-ID indicates container numbers identifying the containers 11 including the receivers 12 that have received the requests. The identification information PID(to) indicates process numbers identifying processes 14 to which the receivers 12 that have received the requests output the requests. The time RSV-TIME indicates time when the receivers 12 that have received the requests have instructed the processes 14 to execute processes corresponding to the requests.

The transmitter database 33 has multiple transmitter entries for storing identification information PID(from), ND-ID, CONT-ID, CONT-IP, REQ-ID, and TRS-TIME. Hereinafter, the identification information TRS-TIME is also referred to as time TRS-TIME. The identification information PID(from) indicates process numbers identifying processes 14 that have output requests to transmitters 13. The identification information ND-ID indicates node numbers identifying container servers 10 including the transmitters 13 that have received the requests. The identification information CONT-ID indicates container numbers identifying containers 11 including the transmitters 13 that have received the requests. The identification information CONT-IP indicates IP addresses of the containers 11 including the transmitters 13 that have received the requests. The identification information REQ-ID indicates request numbers added to the requests by the transmitters 13. The time TRS-TIME indicates time when the transmitters 13 that have received the requests have output the requests to other container servers 10.

The log database 34 has multiple log entries for storing, as identification information, node numbers ND-ID, container numbers CONT-ID, process numbers PID, logs LOG, and time LOG-TIME. The logs LOG include information of events that have occurred during the execution of processes by processes 14. The time LOG-TIME indicates time when the processes 14 have output identification information to be stored in the log database 34.

The IP addresses IP(from) held in the load balancer database 31 are an example of source identification information identifying sources of requests. The request numbers REQ-ID held in the load balancer database 31, the receiver database 32, and the transmitter database 33 are generated by processes 14 and are an example of request identification information identifying the requests transmitted by transmitters 13. The IP addresses LB-IP held in the load balancer database 31 and the IP addresses LD-IP(from) held in the receiver database 32 are an example of distributor identification information identifying the load balancers 41.

The IP addresses CONT-IP(to) held in the load balancer database 31 are an example of destination identification information identifying containers 11 that are destinations of the requests. The IP addresses CONT-IP held in the receiver database 32 are an example of receiver identification information identifying receivers 12 that have received the requests. The IP addresses CONT-IP held in the transmitter database 33 are an example of transmitter identification information identifying the transmitters 13 that have transmitted the requests.

The node numbers ND-ID held in the log database 34, the container numbers CONT-ID held in the log database 34, and the process numbers PID held in the log database 34 are examples of process identification information generated by the processes 14 and identifying the processes 14. The node numbers ND-ID held in the receiver database 32, the container numbers CONT-ID held in the receiver database 32, and the process numbers PID(to) held in the receiver database 32 are examples of the process identification information generated by the processes 14 and identifying the processes 14. The process numbers PID(from) held in the transmitter database 33, the node numbers ND-ID held in the transmitter database 33, and the container numbers CONT-ID held in the transmitter database 33 are examples of the process identifying information identifying the processes generated by the processes 14 and identifying the processes 14.

Hereinafter, the load balancer database 31 is also referred to as LB-DB, the receiver database 32 is also referred to as RSV-DB, the transmitter database 33 is also referred to as TRS-DB, and the log database 34 is also referred to as LOG-DB.

Figure 9:
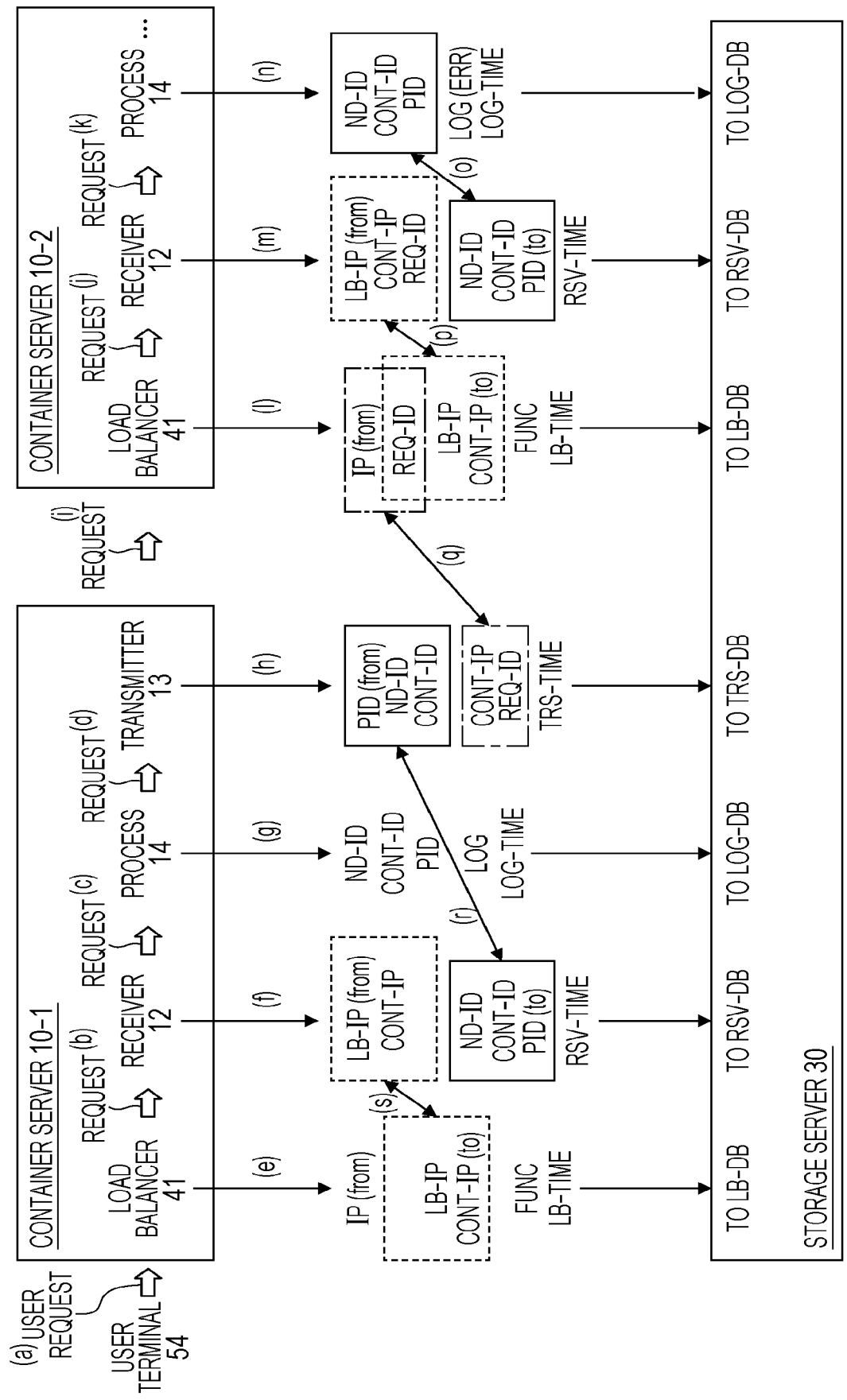
FIG. 9 is a diagram illustrating an example of the flow of requests within the information processing system illustrated in FIG. 4 and an example of information to be stored in the storage server.

FIG. 9 illustrates an example of the flow of requests within the information processing system 102 illustrated in FIG. 4 and an example of information to be stored in the storage server 30. In FIG. 9, a user request issued by a user terminal 54 is transferred to the container server 10-1 for the user interface ((a) illustrated in FIG. 9). In the container server 10-1, the request is sequentially transferred to the load balancer 41, a receiver 12, and a process 14, and a next request generated by the process 14 is transferred to a transmitter 13 ((a), (b), (c), and (d) illustrated in FIG. 9). The load balancer 41, the receiver 12, the process 14, and the transmitter 13 cause such identification information as described with reference to FIG. 8 to be stored in the storage server 30 ((e), (f), (g), and (h) illustrated in FIG. 9). The process 14 causes identification information and a log LOG to be stored in the storage server 30.

The transmitter 13 of the container server 10-1 transmits the request having a request number REQ-ID added thereto to, for example, the container server 10-2 for the account management ((i) illustrated in FIG. 9). In the container server 10-2, the request is sequentially transferred to the load balancer 41, a receiver 12, and a process 14, and the load balancer 41 and the receiver 12 cause identification information to be stored in the storage server 30 ((j), (k), (l), and (m) illustrated in FIG. 9). An error occurs during the execution of the process 14, and the process 14 causes a log LOG (ERR) indicating the error and identification information to be stored in the storage server 30 ((n) illustrated in FIG. 9). Since the error has occurred in the process 14 executed in the container server 10-2, a process based on the user request is interrupted.

After the process based on the user request is interrupted, the system administrator of the information processing system 102 or the like operates the managing server 20 to analyze the cause of the interruption and causes the managing server 20 to issue a log extraction request. The log extractor 21 references the identification information stored in the storage server 30 based on the log extraction request and extracts logs LOG stored in the storage server 30 within a time period from the issuance of the user request to the process in which the error has occurred.

First, the log extractor 21 references a node number ND-ID, a container number CONT-ID, and a process number PID that are included in a log entry included in the LOG-DB and including the log LOG (ERR) specified in the log extraction request. The log extractor 21 searches, from the RSV-DB, a receiver entry including the same identification information as the referenced node number ND-ID, the referenced container number CONT-ID, and the referenced process number PID ((o) illustrated in FIG. 9). The log extractor 21 detects time RSV-TIME stored in the receiver entry identified by the search as the time when the process 14 in which the error has occurred has been generated. Then, the log extractor 21 extracts, from logs LOG stored in the LOG-DB after the detected time, the log LOG that is to be extracted and has been stored by the process 14 in which the error has occurred, and the log extractor 21 writes the extracted log LOG in the extraction list 22 illustrated in FIG. 7.

Next, the log extractor 21 references an IP address LB-LP (from), a container number CONT-IP, and a request number REQ-ID that have been stored in the receiver entry identified by the search. The log extractor 21 searches the LB-DB and identifies a distributor entry including the same identification information as the referenced IP address LB-LP(from), the referenced container number CONT-ID, and the referenced request number REQ-ID ((p) illustrated in FIG. 9). If a request number REQ-ID has been stored in the receiver entry identified by the search, the log extractor 21 may reference not only the IP address LB-LP(from) and the container number CONT-IP but also the request number REQ-ID and search a distributor entry.

If a request number REQ-ID has been stored in the distributor entry identified by the search, a container server 10 (or a transmitter 13 of another container server 10) that has issued a request to a load balancer 41 exists. Thus, the log extractor 21 identifies, from the TRS-DB, a transmitter entry including the same identification information as the IP address IP(from) and the request number REQ-ID that have been stored in the distributor entry identified by the search ((q) illustrated in FIG. 9).

Next, the log extractor 21 references a process number PID(from), a node number ND-ID, and a container number CONT-ID that are included in the transmitter entry identified from the TRS-DB. Similarly to (o) illustrated in FIG. 9, The log extractor 21 searches the RSV-DB and identifies a receiver entry including the same identification information as the referenced process number PID(from), the referenced node number ND-ID, and the referenced container number CONT-ID ((r) illustrated in FIG. 9).

The log extractor 21 detects time RSV-TIME stored in the receiver entry identified by the search as the time when the process 14 that has output the request to the transmitter 13 of the container server 10-1 has been generated. Then, the log extractor 21 extracts, from logs LOG stored in the LOG-DB after the detected time, a log LOG stored by the process 14 of the container server 10-1 and to be extracted and writes the extracted log LOG in the extraction list 22.

Next, the log extractor 21 references an IP address LB-LP (from) and a container number CONT-IP that have been stored in the receiver entry identified by the search. Similarly to (p) illustrated in FIG. 9, the log extractor 21 searches the LB-DB and identifies a distributor entry including the same identification information as the referenced IP address LB-LP(from) and the referenced container number CONT-IP ((s) illustrated in FIG. 9).

If a request number REQ-ID has not been stored in the distributor entry identified by the search, the request received by the load balancer 41 is the user request issued by the user terminal 54. In this case, the log extractor 21 terminates the operation of extracting the log LOG by executing the search.

As illustrated in FIG. 9, even if a process corresponding to a user request is executed, multiple containers 11 sequentially execute processes 14, and the log extractor 21 may extract a series of logs stored in the storage server 30 and corresponding to the user request.

Figure 10:
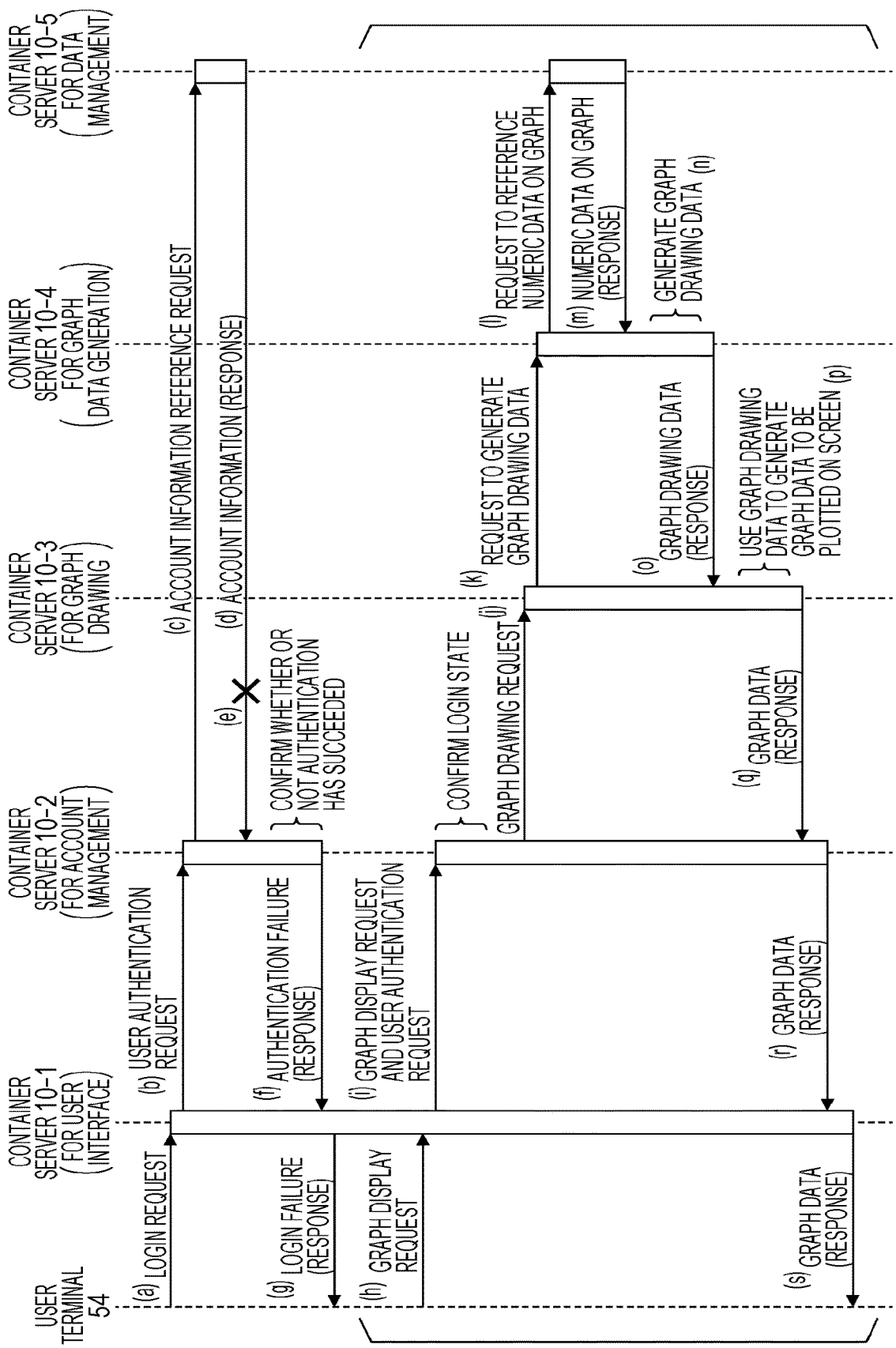
FIG. 10 is a diagram illustrating an example of operations of the information processing system illustrated in FIG. 4.

FIG. 10 illustrates an example of operations of the information processing system 102 illustrated in FIG. 4. In the example illustrated in FIG. 10, the information processing system 102 uses data stored in the storage server 30 or the like to cause a user terminal 54 to display a graph on a screen of the user terminal 54 based on an operation of the user terminal 54 by a user.

First, the user terminal 54 issues a login request (user request) based on a login operation by the user ((a) illustrated in FIG. 10). The login request reaches the container server 10-1 via the user network 52 illustrated in FIG. 4. The load balancer 41 of the container server 10-1 transmits the login request to a container 11 in order to cause the container 11 to execute a login process corresponding to the login request and causes identification information corresponding to the login request to be stored in the LB-DB via the container manager 15 of the container server 10-1. The login request and another request are transmitted and received using packets based on the Hyper Text Transfer Protocol (HTTP), and IP addresses of sources of the requests are stored in headers of the packets, for example. A user ID and a password that are used to execute authentication for the login request are stored in a body of the packet.

An example of the identification information stored in the LB-DB by the load balancer 41 that has received the login request is indicated in a distributor entry (a1) illustrated in FIG. 11. Specifically, the load balancer 41 that has received the login request causes an IP address IP(from) (=10.x.x.x)

of the user terminal 54 and an IP address LD-IP of the load balancer 41 to be stored in the LB-DB. In addition, the load balancer 41 causes the function FUNC (=UI) of the container server 10-1 and an IP address CONT-IP(to) of the container 11 to which the load balancer 41 has output the login request to be stored in the LB-DB. Furthermore, the load balancer 41 causes the time LB-TIME when the load balancer 41 has output the login request to the container 11 to be stored in the LB-DB. In FIG. 11, the time LB-TIME, RSV-TIME, TRS-TIME, and LOG-TIME indicate only "hours, minutes, and seconds", while "years, months, and days" are omitted.

A receiver 12 that is included in the container 11 and has received the login request generates a process 14 for executing the login process and causes identification information corresponding to the login request to be stored in the RSV-DB via the container manager 15. An example of the identification information stored in the RSV-DB by the receiver 12 that has received the login request is indicated in a receiver entry (a2) illustrated in FIG. 11.

Specifically, the receiver 12 that has received the login request causes the IP address LD-IP(from) of the load balancer 41 that has output the login request and the IP address CONT-IP of the container 11 including the receiver 12 to be stored in the RSV-DB. In addition, the receiver 12 causes the node number ND-ID of the container server 10-1 including the receiver 12, a container number CONT-ID of the container 11 including the receiver 12, and a process number PID(to) of the process 14 for executing the login process to be stored in the RSV-DB. Furthermore, the receiver 12 causes the time RSV-TIME when the receiver 12 has instructed the process 14 to execute the process corresponding to the login request to be stored in the RSV-DB.

The process 14 starts the process corresponding to the login request, outputs a user authentication request to a transmitter 13 of the container 11, and causes identification information identifying the process 14 and a log to be stored in the LOG-DB via the container manager 15. Then, the process 14 waits for a response to the user authentication request. An example of the identification information and the log that have been stored in the LOG-DB by the process 14 for executing the process corresponding to the login request is indicated in log entries (a3) and (a4) illustrated in FIG. 11. Specifically, the process 14 causes the node number ND-ID and container number CONT-ID to which the process 14 belongs, the process number PID, and the log LOG to be stored in the LOG-DB. In addition, the process 14 causes the time LOG-TIME when the identification information and the log have been stored in the LOG-DB to be stored in the LOG-DB.

The transmitter 13 that has received the user authentication request causes identification information corresponding to the user authentication request to be stored in the TRS-DB via the container manager 15. In addition, the transmitter 13 generates a request number REQ-ID identifying the user authentication request and transmits the user authentication request having the generated request number REQ-ID added thereto to the container server 10-2 for the account management ((b) illustrated in FIG. 10). If the request number REQ-ID is to be transmitted to another container server 10, the request number REQ-ID is stored in a header of a packet based on the HTTP, for example. An example of the identification information stored in the TRS-DB by the transmitter 13 that has received the user authentication request is indicated in a transmitter entry (a5) illustrated in FIG. 11.

Specifically, the transmitter 13 causes the process number PID(from) of the process 14 that has output the user authentication request, the node number ND-ID of the container server 10-1 including the transmitter 13, and the container number CONT-ID of the container 11 including the transmitter 13 to be stored in the TRS-DB. In addition, the transmitter 13 causes the IP address CONT-IP of the container 11 including the transmitter 13 and the newly generated request number REQ-ID to be stored in the TRS-DB. Furthermore, the transmitter 13 causes the time TRS-TIME when the transmitter 13 has transmitted the user authentication request to the container server 10-2 to be stored in the TRS-DB.

The load balancer 41 of the container server 10-2 that has received the user authentication request outputs the user authentication request to a container 11 for executing an authentication process corresponding to the user authentication request. In addition, the load balancer 41 causes identification information corresponding to the user authentication request to be stored in the LB-DB via the container manager 15 of the container server 10-2. An example of the identification information stored in the LB-DB by the load balancer 41 that has received the user authentication request is indicated in a distributor entry (b1) illustrated in FIG. 11. If the user authentication request includes a request number REQ-ID, the request number REQ-ID (="a") is stored as identification information in the LB-DB.

A receiver 12 that is included in the container 11 and has received the user authentication request generates a process 14 for executing the authentication process and causes identification information corresponding to the user authentication request to be stored in the RSV-DB via the container manager 15. An example of the identification information stored in the RSV-DB by the receiver 12 that has received the user authentication request is indicated in a receiver entry (b2) illustrated in FIG. 11.

The process 14 starts the process corresponding to the user authentication request, generates an account information reference request, outputs the generated account information reference request to a transmitter 13 of the container 11, and causes identification information and a log to be stored in the LOG-DB via the container manager 15. Then, the process 14 waits for a response to the account information reference request. An example of the identification information and the log that have been stored in the LOG-DB by the process 14 for executing the process corresponding to the user authentication request is indicated in a log entry (b3) illustrated in FIG. 11.

The transmitter 13 that has received the account information reference request causes identification information corresponding to the account information reference request to be stored in the TRS-DB via the container manager 15 and transmits the account information reference request to the container server 10-5 for the data management ((c) illustrated in FIG. 10). An example of the identification information stored in the TRS-DB by the transmitter 13 that has received the account information reference request is indicated in a transmitter entry (b4) illustrated in FIG. 11.

The load balancer 41 of the container server 10-5 that has received the account information reference request outputs the account information reference request to a container 11 of the container server 10-5 in order to cause the container 11 to execute a data reference process corresponding to the account information reference request. In addition, the load balancer 41 causes identification information corresponding to the account information reference request to be stored in the LB-DB via the container manager 15 of the container server 10-5. An example of the identification information stored in the LB-DB by the load balancer 41 of the container server 10-5 that has received the account information reference request is indicated in a distributor entry (c1) illustrated in FIG. 11.

A receiver 12 of the container 11 that has received the account information reference request generates a process 14 for executing the data reference process and causes identification information corresponding to the account information reference request to be stored in the RSV-DB via the container manager 15. An example of the identification information stored in the RSV-DB by the receiver 12 that has received the account information reference request is indicated in a receiver entry (c2) illustrated in FIG. 11.

The process 14 starts the process corresponding to the account information reference request, generates account information (response) corresponding to the account information reference request, and outputs the generated account information to a transmitter 13 of the container 11. In addition, the process 14 causes identification information and a log to be stored in the LOG-DB via the container manager 15 of the container server 10-5. An example of the identification information and the log that have been stored in the LOG-DB by the process 14 for executing the process corresponding to the account information reference request is indicated in a log entry (c3) illustrated in FIG. 11.

The transmitter 13 of the container 11 of the container server 10-5 that has received the account information transmits the account information to the container server 10-2 ((d) illustrated in FIG. 10). In the case where the transmitter 13 transmits the response such as the account information to the other container server 10, the transmitter 13 does not cause identification information to be stored in the TRS-DB.

As indicated by a symbol X in FIG. 10, due to a temporal failure of a communication path between the container server 10-2 and the container server 10-5 or the like, the account information (response) transmitted by the container server 10-5 does not reach the container server 10-2 ((e) illustrated in FIG. 10). Thus, in the container server 10-2, the load balancer 41 and the receiver 12 of the container 11 that has output the account information reference request do not receive the account information (response).

Since the process 14 that is included in the container server 10-2 and has generated the account information reference request does not receive the account information (response) within a defined time period, the process 14 that has generated the account information reference request interrupts the authentication process corresponding to the login request. The process 14 causes the identification information identifying the process 14 and a log LOG indicating that the authentication process has failed to be stored in the log database 34 via the container manager 15. An example of the identification information and the log that have been stored in the log database 34 by the process 14 that has interrupted the authentication process is indicated in log entries (d1) and (d2) illustrated in FIG. 11. "ERR" stored in a field for logs LOG in the log entry (d1) illustrated in FIG. 11 indicates that the authentication process corresponding to the login request has been interrupted since the account information (response) has not been received within the defined time period.

Then, the process 14 of the container server 10-2 outputs a response indicating the failure of the authentication to the container server 10-1 for the user interface via the transmitter 13 of the container server 10-2 ((f) illustrated in FIG. 10). If the process 14 has normally received the account information (response), the process 14 confirms, based on the account information (response), whether or not the user authentication request is valid, and the process 14 outputs a response indicating the result of the confirmation to the container server 10-1 for the user interface.

In the container server 10-1, the process 14 that has generated the user authentication request receives the response indicating the failure of the authentication via the load balancer 41 and the receiver 12. The process 14 outputs the response indicating the failure of the authentication via the transmitter 13 to the user terminal 54 that has issued the login request ((g) illustrated in FIG. 10). In the case where the load balancer 41 has received the response such as the account information from another container server 10, the load balancer 41 does not cause identification information to be stored in the load balancer database 31. Similarly, in the case where the receiver 12 has received the response such as the account information from another container server 10, the receiver 12 does not cause identification information to be stored in the receiver database 32.

The process 14 of the container server 10-1 outputs, to the user terminal 54, display data indicating the completion of the login or a failure of the login as a response to the login request. The user terminal 54 causes a display device of the user terminal 54 to display the display data indicating the completion or failure of the login. In the example illustrated in FIG. 10, the failure of the login occurs due to the temporal failure of the communication path or the like, not due to a user's input error. In this case, "500 Internal Server Error" is displayed by the display device of the user terminal 54, for example. The user that has viewed the information displayed by the display device sends an inquiry to the system administrator of the information processing system 102 or the like, for example. The system administrator who has received the inquiry operates the managing server 20, finds an error log from information held in the log database 34, and issues a log extraction request to the log extractor 21. An example of a log extraction operation to be executed by the log extractor 21 that has received the log extraction request is illustrated in FIG. 16.

Operations indicated in brackets on the lower side of FIG. 10 indicate an example in which after the authentication for the login request succeeds and the login is completed, a graph is displayed on the screen of the user terminal 54. A description of operations that are executed in the container servers 10-1, 10-2, 10-3, 10-4, and 10-5 and are the same as or similar to the operations corresponding to the login request is omitted. Specifically, when the load balancer 41 of the container server 10-1 receives a request from the user terminal 54 or another container server 10, the load balancer 41 outputs the request to a container 11 of the container server 10-1 in order to cause the container 11 to process the received request and causes identification information corresponding to the request to be stored in the load balancer database 31. A receiver 12 of the container 11 receives the request, generates a process 14 based on the reception of the request, and causes identification information corresponding to the request to be stored in the RSV-DB.

Upon starting a process based on the request and generating a new request, the process 14 outputs the new request to a transmitter 13 of the container 11 and causes a log LOG indicating the execution of the process and identification information to be stored in the LOG-DB. Upon receiving the new request from the process 14, the transmitter 13 causes identification information corresponding to the new request to be stored in the TRS-DB and transmits the new request to the container server 10-2.

First, the user terminal 54 uses, based on a user operation, product sales data held in the storage server 30 or the like to issue a graph display request to display a graph indicating changes in sales for months ((h) illustrated in FIG. 10). A container 11 of the container server 10-1 that has received the graph display request outputs the graph display request and the user authentication request to the container server 10-2 in order to confirm a login state ((i) illustrated in FIG. 10). After a container 11 of the container server 10-2 confirms the login state, the container 11 of the container server 10-2 outputs, to the container server 10-3, a graph drawing request corresponding to the graph display request in order to acquire graph data to be used to cause the user terminal 54 to display the graph ((j) illustrated in FIG. 10).

A container 11 of the container server 10-3 that has received the graph drawing request outputs, to the container server 10-4, a request to generate graph drawing data in order to acquire the graph drawing data to be used for drawing of the graph ((k) illustrated in FIG. 10). A container 11 of the container server 10-4 that has received the request to generate the graph drawing data outputs, to the container server 10-5, a request to reference the graph data in order to acquire data to be used for the drawing of the graph ((I) illustrated in FIG. 10). A container 11 of the container server 10-5 that has received the request to reference the graph data reads, from the storage server 30 or the like, sales data (numeric data for flags) to be displayed in the graph. Then, the container 11 of the container server 10-5 outputs, as a response to the reference request, the read numeric data to the container server 10-4 ((m) illustrated in FIG. 10).

The container 11 of the container server 10-4 uses the received numeric data to generate the graph drawing data ((n) illustrated in FIG. 10). The container 11 of the container server 10-4 outputs, as a response to the request to generate the graph drawing data, the generated graph drawing data to the container server 10-3 ((o) illustrated in FIG. 10). The container 11 of the container server 10-3 uses the received graph drawing data to generate the graph data to be plotted on the screen of the user terminal 54 ((p) illustrated in FIG. 10). The container 11 of the container server 10-3 outputs, as a response to the graph drawing request, the generated graph data to the container server 10-2 ((q) illustrated in FIG. 10).

The container 11 of the container server 10-2 outputs the received graph data as a response to the graph display request to the container server 10-1 ((r) illustrated in FIG. 10). The container 11 of the container server 10-1 outputs the received graph data as a response to the graph display request to the user terminal 54 in order to cause the graph data to be displayed on the screen of the user terminal 54 ((s) illustrated in FIG. 10). Then, the user terminal 54 displays the graph data on the screen.

FIG. 11 illustrates an example of the information stored in the storage server 30 by the container servers 10 in the authentication process corresponding to the login request illustrated in FIG. 10. In FIG. 11, symbols (a1), (b1), (c1), and the like illustrated on the left side of the entries of the load balancer database 31, the receiver database 32, the transmitter database 33, and the log database 34 indicate the entries corresponding to the operations described with reference to FIG. 10. In addition, "user interface" "account management", and "data management" that are illustrated on the right side of the entries in FIG. 11 indicate the types of the container servers 10 that cause information to be stored in the authentication process based on the login request described with reference to FIG. 10. In addition, in FIG. 11, time LB-TIME, RSV-TIME, TRS-TIME, and LOG-TIME indicates only "hours, minutes, and seconds", while "years, months, and days" are omitted.

FIG. 12 illustrates an example of information stored in the container generation history record database 35 illustrated in FIG. 7. The container managers 15 of the container servers 10 cause node numbers ND-ID, container numbers CONT-ID, and time HIST-TIME to be stored in the container generation history record database 35 upon the generation of containers 11. The generated containers 11 are identified by the node numbers ND-ID and the container numbers CONT-ID. In FIG. 12, the time HIST-TIME indicates only "hours, minutes, and seconds", while "years, months, and days" are omitted.

The example illustrated in FIG. 12 indicates that, at 9:00:00 (9 o'clock 0 minutes 0 seconds), two containers 11 identified by container numbers CONT-ID "21" and "22" are generated in the container server 10-2, and two containers 11 identified by container numbers CONT-ID "11" and "12" are generated in the container server 10-1. In addition, the example illustrated in FIG. 12 indicates that, at 9:02:00, a container 11 identified by a container number CONT-ID "52" is generated in the container server 10-5. Hereinafter, the container generation history record database 35 is also referred to as HIST-DB.

FIG. 13 illustrates an example of operations of each of the load balancers 41 illustrated in FIG. 4. In other words, FIG. 13 illustrates an example of a control method of the information processing system 102. A process illustrated in FIG. 13 is repeatedly executed at a predetermined frequency.

First, if the load balancer 41 has received a request from a user terminal 54 or another container server 10 in step S10, the load balancer 41 causes the process to proceed to step S12. If the load balancer 41 has not received the request in step S10, the load balancer 41 terminates the process. In step S12, the load balancer 41 determines a container 11 for executing a process corresponding to the request and outputs the request to the determined container 11. The request output by the load balancer 41 is received by a receiver 12 of the container 11. Next, in step S14, the load balancer 41 causes identification information corresponding to the request to be stored in the LB-DB and terminates the process.

FIG. 14 illustrates an example of operations of each of the container servers 10 illustrated in FIG. 4. In other words, FIG. 14 illustrates an example of the control method of the information processing system 102 and an example of a control program to be executed in the information processing system 102. A process illustrated in FIG. 14 is repeatedly executed at a predetermined frequency.

First, if a receiver 12 of a container 11 of the container server 10 has received a request in step S20, the container 11 causes the process to proceeds to step S22. If the receiver 12 has not received the request in step S20, the container 11 terminates the process. In step S22, the receiver 12 that is included in the container 11 of the container server 10 and has received the request generates a process 14 for executing a process corresponding to the request and causes identification information corresponding to the request to be stored in the RSV-DB via a container manager 15 of the container server 10.

Next, in step S24, the process 14 generated to execute the process corresponding to the request in the container server 10 starts the process, and if an event has occurred, the process 14 causes a log LOG corresponding to the event and identification information identifying the process 14 to be stored in the LOG-DB via the container manager 15.

Next, in step S26, if the process 14 that executes the process in the container server 10 transmits a new request generated based on the process to another container server 10, the process 14 causes the process to proceed to step S28. In step S26, if the process 14 that executes the process in the container server 10 returns a response based on the process to a source that has issued the request, the process 14 causes the process to proceed to step S36.

In step S28, the process 14 that executes the process in the container server 10 outputs the new request generated based on the process to a transmitter 13 of the container 11. Next, in step S30, the transmitter 13 that has received the request adds a request number REQ-ID to the request, transmits the request having the request number REQ-ID added thereto to the other container server 10, and causes identification information corresponding to the request to be stored in the transmitter database 33 via the container manager 15. Next, in step S32, the container 11 that has transmitted the request having the request number REQ-ID added thereto to the other container server 10 waits for the reception of a response, and if the container 11 has received the response, the container 11 causes the process to step S34.

In step S34, the process 14 of the container 11 that has received the response executes a process based on the response, outputs the response to the transmitter 13, and causes the process to proceed to step S36. In step S36, the transmitter 13 that has received the response transmits the response to the other container server 10 or the user terminal 54 that has issued the request. Then, the transmitter 13 terminates the process.

FIG. 15 illustrates an example of operations, to be executed by each of the container managers 15 illustrated in FIG. 4, of managing containers 11. In other words, FIG. 15 illustrates an example of the control method of the information processing system 102. A process illustrated in FIG. 15 is repeatedly executed at a predetermined frequency.

First, in step S40, if the container manager 15 estimates that the amount of processing executed by a container server 10 to which the container manager 15 belongs increases and exceeds the maximum amount of processing able to be executed by existing generated containers 11 of the container server 10, the container manager 15 causes the process to proceed to step S42. If the container manager 15 determines that the processing is able to be continuously executed by the existing generated containers 11, the container manager 15 causes the process to proceed to step S46.

In step S42, the container manager 15 generates a new container 11 and causes the process to proceed to step S44. In step S44, the container manager 15 causes a node number ND-ID, a container number CONT-ID, and time HIST-TIME to be stored in the HIST-DB and terminates the process.

In step S46, if the container manager 15 determines that the amount of the processing executed by the container server 10 to which the container manager 15 belongs has been reduced and that a smaller number of containers 11 than the number of the existing generated containers 11 are able to execute the processing, the container manager 15 causes the process to proceed to step S48. If the container manager 15 determines that the difference between the maximum amount of processing able to be executed by the existing generated containers 11 and the amount of the currently executed processing is in a predetermined range and that the existing generated containers 11 are able to execute the processing, the container manager 15 causes the process to proceed to step S50. In step S48, the container manager 15 deletes one or more of the containers 11 based on the amount of the currently executed processing and terminates the process.

In step S50, if the container manager 15 has received, from a receiver 12, a transmitter 13, or a process 14, information to be stored in the storage server 30, the container manager 15 causes the process to proceed to step S52, and if the container manager 15 has not received the information, the container manager 15 terminates the process. In step S52, the container manager 15 causes the information to be stored in the RSV-DB, the TRS-DB, or the LOG-DB and terminates the process.

FIG. 16 illustrates an example of operations of the log extractor 21 illustrated in FIG. 4. In other words, FIG. 16 illustrates an example of the control method of the information processing system 102. A process illustrated in FIG. 16 is repeatedly executed at a predetermined frequency.

First, in step S60, the log extractor 21 references a node number ND-ID, a container number CONT-ID, and a process number PID that have been stored in a log entry that is among the log entries of the LOG-DB and specified in a log extraction request. Hereinafter, the node number ND-ID, the container number CONT-ID, and the process number PID that are stored in the LOG-DB are also referred to as RSV specific information.

In the example illustrated in FIG. 11, the log entry (d1) in which the log LOG (ERR) indicating the error is stored is specified in the log extraction request. In this case, the RSV specific information is a node number ND-ID "2", a container number CONT-ID "21", and a process number PID "1". The log extractor 21 searches the RSV-DB and identifies a receiver entry including the same information as the RSV specific information. If the log extractor 21 identifies multiple receiver entries including the same information as the RSV specific information, the log extractor 21 identifies a receiver entry holding time RSV-TIME that is before and closest to time LOG-TIME stored together with the log LOG (ERR) in the log entry. In the example illustrated in FIG. 11, the log extractor 21 identifies the receiver entry (b2) from the receiver entry holding the time RSV-TIME "9:09:50" and a receiver entry holding time RSV-TIME "9:10:20".

Next, in step S62, the log extractor 21 sets the time RSV-TIME (time when a process 14 targeted for the extraction has been generated) held in the identified receiver entry to the start time of the log extraction and sets the current time to the end time of the log extraction. The current time is the time when the log extractor 21 executes step S62. In the example illustrated in FIG. 11, the time RSV-TIME "9:09:50" included in the receiver entry (b2) is set to the start time of the log extraction, and the current time is set to the end time of the log extraction.

Next, in step S64, the log extractor 21 references time RSV-TIME held in the RSV-DB and determines whether or not a receiver entry that includes the same information as the RSV specific information exists among receiver entries holding time RSV-TIME after the start time. Since a receiver entry including the same information as the RSV specific information among the receiver entries in which information has been stored after the start time holds information corresponding to a process different from a process from which an error has occurred, the receiver entry including the same information as the RSV specific information is not related to a log LOG to be extracted. If the receiver entry including the same information as the RSV specific information exists, the process proceeds to step S66. If the receiver entry including the same information as the RSV specific information does not exist, the process proceeds to step S68. In the example illustrated in FIG. 11, the receiver entry (holding time RSV-TIME "9:11:20") including the same information as the RSV specific information exists, the process proceeds to step S66.

In step S66, the log extractor 21 sets, to the end time, the time RSV-TIME held in the receiver entry found in step S64 and including the same information as the RSV specific information and causes the process to step S68. In the example illustrated in FIG. 11, the time RSV-TIME "9:11:20" is set to the end time. Thus, it may be possible to suppress the extraction of a log LOG that is not to be extracted, and it may be possible to suppress the interruption of the analysis of the cause of the error. In other words, in the microservices, even if a container 11 is deleted and regenerated by a container manager 15, and multiple common sets of the RSV specific information are stored in the RSV-DB, it may be possible to suppress the extraction of a log LOG that is not to be extracted.

In step S68, the log extractor 21 extracts a log LOG included in a log entry that is among the log entries of the LOG-DB and includes the same information as the RSV specific information and holds time LOG-TIME between the start time and the end time. The log extractor 21 writes the extracted log LOG in the extraction list 22 illustrated in FIG. 7. In the example illustrated in FIG. 11, logs LOG are extracted from log entries holding time LOG-TIME "9:10:00", "9:10:35", "9:11:00", and "9:11:15" between the start time "9:09:50" and the end time "9:11:20". Since the log entry holding the time LOG-TIME "9:11:20" has been stored after the end time, the log entry holding the time LOG-TIME "9:11:20" is removed from the logs LOG to be extracted.

Next, in step S70, the log extractor 21 references an IP address LB-LP(from), an IP address CONT-IP, and a request number REQ-ID that are held in the receiver entry identified in step S60 or held in a receiver entry identified in step S70 (described later). Hereinafter, the IP address LB-LP(from), the IP address CONT-IP, and the request number REQ-ID that are stored in the RSV-DB are also referred to as LB specific information. The log extractor 21 searches distributor entries of the LB-DB and identifies a distributor entry holding the LB specific information.

Next, in step S72, the log extractor 21 determines whether or not a request number REQ-ID is included in the identified distributor entry. If the request number REQ-ID is not included in the identified distributor entry, information of the distributor entry including the LB specific information has been stored based on a user request issued by a user terminal 54. In this case, all logs LOG generated by the process 14 based on the user request have been extracted, a process of extracting the logs LOG is terminated. On the other hand, if the request number REQ-ID is included in the identified distributor entry, the information of the distributor entry including the LB specific information has been stored based on a request issued by another container server 10. In this case, since the extraction of logs LOG generated by processes 14 of the other container server 10 has yet to be completed, the process proceeds to step S74 in order to continue the extraction of the logs LOG.

In step S74, the log extractor 21 references the IP address IP(from) and the request number REQ-ID that are held in the distributor entry identified in step S70 and included in the LB-DB. Hereinafter, the IP address IP(from) and the request number REQ-ID that are stored in the LB-DB are also referred to as TRS specific information. The log extractor 21 searches the TRS-DB and identifies a transmitter entry including the same information as the TRS specific information.

Next, in step S76, the log extractor 21 references a process number PID(from), a node number ND-ID, and a container number CONT-ID that are held in the transmitter entry identified in step S74 and included in the TRS-DB. Specifically, the log extractor 21 references the RSV specific information held in the transmitter entry identified in step S74. The log extractor 21 searches the TRS-DB and identifies a receiver entry including the same information as the RSV specific information. After that, the log extractor 21 causes the process to proceed to step S62 and extracts a log LOG from the LOG-DB while treating, as the start time, time RSV-TIME held in the receiver entry identified in step S76.

In the embodiment described with reference to FIGS. 4 to 16, effects that are the same as or similar to those obtained in the embodiment described with reference to FIGS. 1 and 2 may be obtained. For example, the log extractor 21 may automatically extract logs LOG of processes sequentially executed by multiple containers 11 based on a request. In addition, even in the case where the information processing system 102 includes the multiple load balancers 41, the log extractor 21 may identify, based on an IP address LB-IP, a load balancer 41 that has transmitted a request to a container 11.

In the embodiment described with reference to FIGS. 4 to 16, the following effects may be obtained. The container managers 15 control the writing in the log database 34 and cause logs and identification information that have been output from processes 14 to be stored in the log database 34 without modification of the processes 14 (application programs). Thus, the log extractor 21 may automatically extract logs generated due to processes sequentially executed by multiple containers 11 without a reduction in the versatility of the processes 14. In other words, the log extractor 21 may automatically extract the logs without a reduction in the availability and portability of the microservices.

Since steps S60, S62, S64, and S66 illustrated in FIG. 16 are executed, the extraction of a log that is not to be extracted may be suppressed by setting, based on identification information held in the RSV-DB, a range of logs to be extracted. Since a log that is not to be extracted is not extracted, it may be possible to suppress the interruption of the analysis of the cause of the occurrence of an error. In other words, in the microservices, even if multiple common sets of the RSV specific information are stored in the RSV-DB after the deletion and regeneration of a container 11 by a container manager 15, the extraction of a log LOG that is not to be extracted may be suppressed.

The completion of the operation of extracting logs LOG may be easily determined by using a request number REQ-ID stored in the LB-DB to identify a source that has issued a request, compared with the case where a source that has issued a request is identified based on an IP address IP(from).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A log system comprising:
a storage device configured to store logs of processes executed in application execution environments based on requests;
first circuitry coupled to the storage device and configured to control the application execution environments for sequentially processing the requests; and
second circuitry coupled to the storage device and configured to transmit each of the requests to a selected one of the application execution environments;
wherein the first circuitry is configured to:
execute, when a first application execution environment included in the application execution environments receives a first request from the second circuitry, a first process for processing the first request in the first application execution environment,
add second request information identifying a second request to the second request generated due to execution of the first process,
transmit the added second request to the second circuitry,
execute, for storing in the storage a first log generated due to the execution of the first process, a first output process that outputs process information identifying the first process, reception information identifying the first application execution environment, first request information identifying the first request, the second request information, source information identifying the first application execution environment as a transmission source of the second request, and the first log, and
wherein the second circuitry is configured to:
transmit the second request to a second application execution environment included in the application execution environments in order to cause the second application execution environment to process the second request, and
execute a second output process that outputs the source information identifying the first application execution environment, destination information identifying the second application execution environment as a transmission destination of the second request, and the second request information.

2. The log system according to claim 1,
wherein the first output process includes a third output process that outputs the process information identifying a first process, reception information identifying the first application execution environment that has received the first request, and the first request information for storage in the storage device, a fourth output process that outputs the process information identifying the first process, the second request information, and source information identifying the first application execution environment for storage in the storage device, and a fifth output process that outputs the process information identifying the first process and the first log for storage in the storage device.

3. The log system according to claim 2, further comprising: third circuitry coupled to the storage device and configured to extract the logs based on the process information stored in the storage device in accordance with an order in which the requests have been processed.

4. The log system according to claim 3,
wherein the second circuitry includes transmission execution environments,
wherein a first transmission execution environment, included in the transmission execution environments, outputs distribution information for storage in the storage device that identifies the first transmission execution environment in the second output process, and
wherein the first application execution environment, in the first output process, outputs distribution identification information for storage in the storage device that identifies a second transmission execution environment included in the application execution environments as a source of the first request.

5. The log system according to claim 3,
wherein the storage device includes reception entries including information outputted in the third output process, transmission entries including information outputted in the fourth output process, log entries including information outputted in the fifth output process, and distribution entries including information outputted in the second output process, and
wherein the third circuitry,
identifies a first reception entry holding the same process information as process information included in a first log entry designated in an extraction request,
identifies a first distribution entry holding the same transmission destination information as reception information included in the first reception entry,
identifies a first transmission entry holding the same transmission source information as transmission source information included in the first distribution entry,
identifies a second log entry holding the same process information as process information included in the first transmission entry, and
extracts a log included in the second log entry.

6. The log system according to claim 5,
wherein a process of extracting the log in accordance with the order in which the requests have been processed is a process of sequentially identifying the reception entry, the distribution entry, the transmission entry, and the log entries based on the process information repeatedly until transmission destination information included in a specific distribution entry indicating an external device is detected.

7. The log system according to claim 5,
wherein the third output process includes outputting a time when a command related to the first process has been generated,
wherein the fifth output process includes outputting a time when the second request has been outputted, and
wherein in a process of identifying the first reception entry, if more than two reception entries holding the same process information as the process information included in the first log entry exist, the third circuitry identifies the first reception entry that is included in the more than two reception entries and holds time that is before and closest to time included in the first log entry.

8. The log system according to claim 7,
wherein in a process of identifying the second log entry, the third circuitry identifies the second log entry including time that is after the time included in the first reception entry.

9. The log system according to claim 2, further comprising
fourth circuitry configured to write in the storage device the information outputted in the first output process, the second output process, the third output process, the fourth output process, and the fifth output process.

10. The log system according to claim 2, wherein the storage device includes a reception database for storing information outputted in the third output process, a transmission database for storing information outputted in the fourth output process, a log database for storing information outputted in the fifth output process, and a distribution database for storing information outputted in the second output process.

11. A computer-implemented log method comprising:

controlling application execution environments for sequentially processing requests;

transmitting a first request to a first application execution environment of the application execution environments;

executing a first process for processing the first request in the first application execution environment;

adding second request information identifying a second request to the second request generated due to the executing of the first process;

outputting, for storing in a storage device a first log generated due to the executing of the first process, process information identifying the first process, reception information identifying the first application execution environment, first request information identifying the first request, the second request information, source information identifying the first application execution environment as a transmission source of the second request, and the first log;

transmitting the added second request to a second application execution environment of the application execution environments; and in response to the transmitting of the added second request, outputting the source information identifying the first application execution environment, destination information identifying the second application execution environment as a transmission destination of the second request, and the second request information.

12. The log method according to claim 11, further comprising:

extracting logs from the storage device based the process information stored in the storage device in accordance with an order in which the requests have been processed.

13. A non-transitory computer-readable medium storing instructions executable by one or more computers, the instructions comprising:

one or more instructions for controlling application execution environments for sequentially processing requests;

one or more instructions for transmitting a first request to a first application execution environment of the application execution environments;

one or more instructions for executing a first process for processing the first request in the first application execution environment;

one or more instructions for adding second request information identifying a second request to the second request generated due to the executing of the first process;

one or more instructions for outputting, for storing in a storage device a first log generated due to the executing of the first process, process information identifying the first process, reception information identifying the first application execution environment, first request information identifying the first request, the second request information, source information identifying the first application execution environment as a transmission source of the second request, and the first log;

one or more instructions for transmitting the added second request to a second application execution environment of the application execution environments; and one or more instructions for, in response to the transmitting of the added second request, outputting the source information identifying the first application execution environment, destination information identifying the second application execution environment as a transmission destination of the second request, and the second request information.

* * * * *